(12) United States Patent
Kotaki et al.

(10) Patent No.: US 6,971,508 B2
(45) Date of Patent: Dec. 6, 2005

(54) BELT CONVEYOR AND AUXILIARY EQUIPMENT THEREOF

(75) Inventors: Takashi Kotaki, Hyogo (JP); Tsunetoshi Goto, Osaka (JP); Yoshiki Nishida, Hyogo (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 10/344,566

(22) PCT Filed: Mar. 13, 2002

(86) PCT No.: PCT/JP02/02337

§ 371 (c)(1), (2), (4) Date: Aug. 11, 2003

(87) PCT Pub. No.: WO02/074666

PCT Pub. Date: Sep. 26, 2002

(65) Prior Publication Data

US 2004/0026218 A1    Feb. 12, 2004

(30) Foreign Application Priority Data

Mar. 15, 2001    (JP)    ............................. 2001-074040

(51) Int. Cl.[7] .......................................... B65G 15/60
(52) U.S. Cl. ..................................................... 198/811
(58) Field of Search ................................ 198/811, 823

(56) References Cited

U.S. PATENT DOCUMENTS

| | | | | |
|---|---|---|---|---|
| 3,381,799 A | * | 5/1968 | Zdenek | ........................ 198/823 |
| 4,289,230 A | * | 9/1981 | McGee | ........................ 198/811 |
| 5,042,646 A | * | 8/1991 | Beatty | ........................ 198/819 |
| 5,829,577 A | * | 11/1998 | Grisley | ........................ 198/811 |
| 6,170,644 B1 | * | 1/2001 | Nakaegawa et al. | ........ 198/811 |

FOREIGN PATENT DOCUMENTS

| | | |
|---|---|---|
| JP | 53-26085 | 12/1951 |
| JP | 53-141681 | 4/1952 |
| JP | 55-129226 | 6/1954 |
| JP | 56-112113 | 4/1955 |
| JP | 49-37978-01 | 4/1974 |
| JP | 49-43828 | 11/1974 |
| JP | 52-093071 A1 | 8/1977 |

(Continued)

OTHER PUBLICATIONS

International Search Report for International Application No. PCT/JP02/02337 dated Jun. 13, 2002 by the Japanese Patent Office.

(Continued)

Primary Examiner—Joe Dillon, Jr.
(74) Attorney, Agent, or Firm—Marshall, Gerstein & Borun LLP

(57) ABSTRACT

Disclosed is a belt conveyor capable of greatly reducing friction resistance between side portions of a belt and troughs, comprising troughs (5), a belt moving above the troughs (5) along a longitudinal direction thereof, belt bending members (12) provided outside on both sides of the belt in the width direction so as to be located upstream of an entrance (5a) of the troughs, for abutting with both side portions of the belt to be bent upwardly, load cells (14) for detecting a reactive force exerted by the belt with which the belt bending members (12) make contact, guide rails (16) engaged to cause the belt bending members (12) to be displaced to be fixed at a desired position so as to bend the side portions of the belt or restore the bent belt, and rails (20) for moving the guide rails (16) along the longitudinal direction of the belt.

7 Claims, 33 Drawing Sheets

FOREIGN PATENT DOCUMENTS

| | | |
|---|---|---|
| JP | 58-109307 A1 | 6/1983 |
| JP | 58-106319 | 7/1983 |
| JP | 58-197105 A1 | 11/1983 |
| JP | SHO 63-142317 A1 | 9/1988 |
| JP | 03-003809 A1 | 1/1991 |
| JP | 6-10218 | 2/1994 |
| JP | U3000104 | 5/1994 |
| JP | 06-321289 A1 | 11/1994 |
| JP | 06-087321 A1 | 12/1994 |
| JP | 7-15626 | 3/1995 |
| JP | 08-169520 A1 | 7/1996 |
| JP | 08-244984 A1 | 9/1996 |
| JP | 09-216714 A1 | 8/1997 |
| JP | 09-267906 A1 | 10/1997 |
| JP | 10-279033 A1 | 2/1998 |
| JP | 10-316244 A1 | 12/1998 |
| JP | 10-329920 A1 | 12/1998 |
| JP | 11-091922 A1 | 4/1999 |
| JP | 11-116018 A1 | 4/1999 |
| JP | 11-343016 A1 | 12/1999 |
| JP | 2000-118660 A1 | 4/2000 |
| JP | 2000-118661 A1 | 4/2000 |
| JP | 2000-159317 A1 | 6/2000 |
| JP | 2002-060037 A1 | 2/2002 |
| JP | 2002-114344 A1 | 4/2002 |
| JP | 2002-120914 A1 | 4/2002 |
| JP | 2002-120918 A1 | 4/2002 |

OTHER PUBLICATIONS

Japanese Office Action (no translation).

* cited by examiner

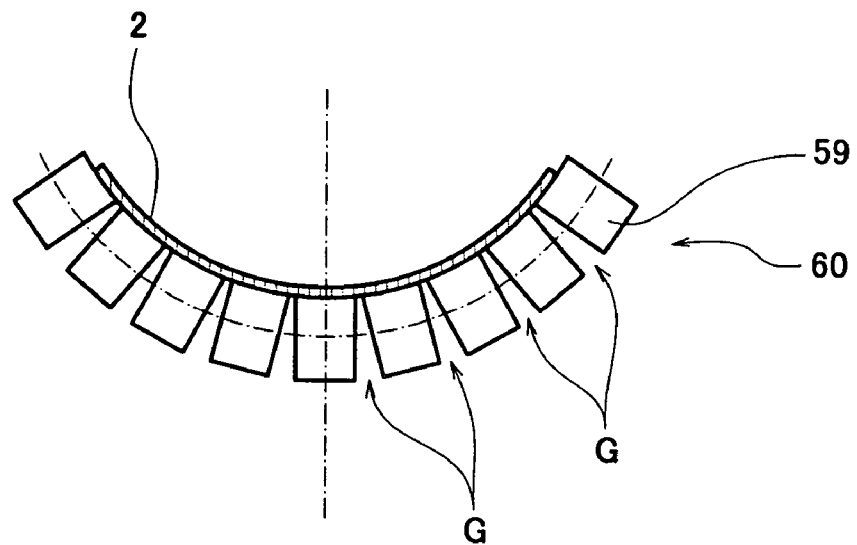
Fig. 1 5 (a)
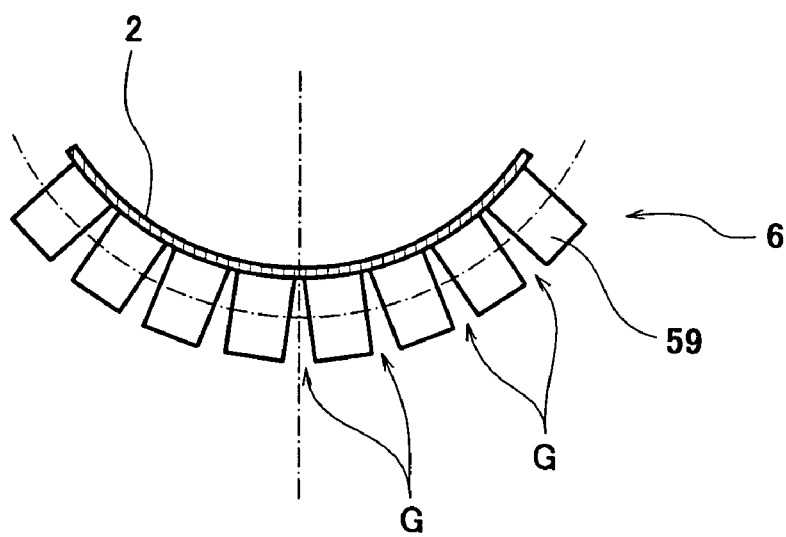
Fig. 1 5 (b)

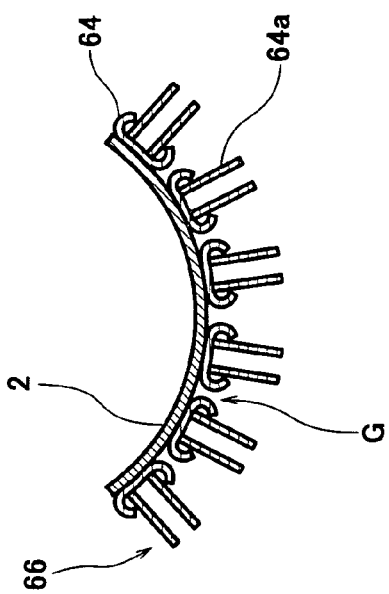
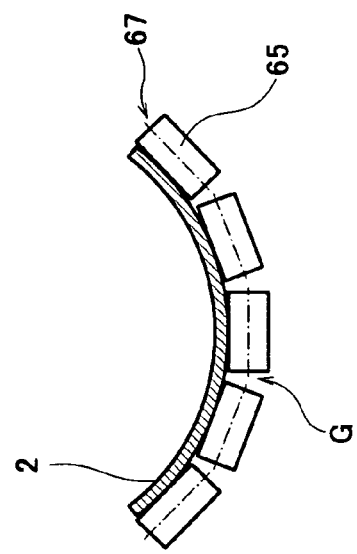
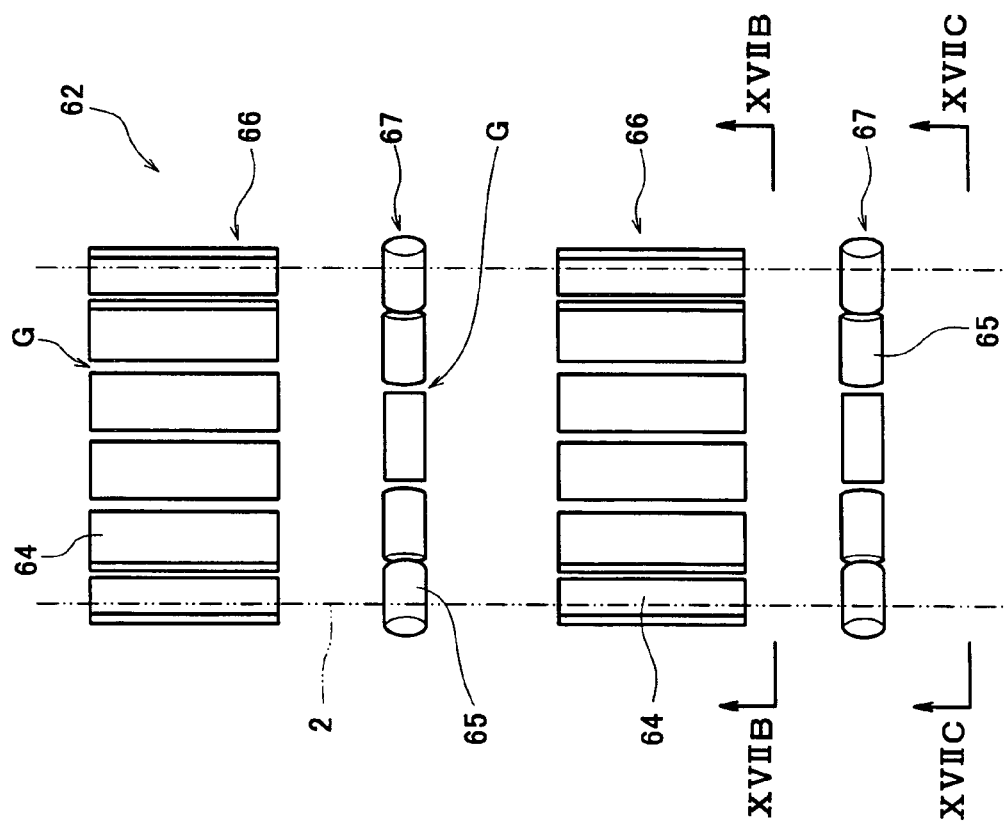
Fig. 17(a)
Fig. 17(b)
Fig. 17(c)

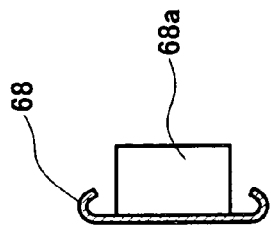
Fig. 1 8 (b)
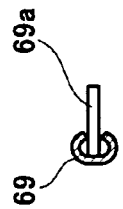
Fig. 1 8 (c)
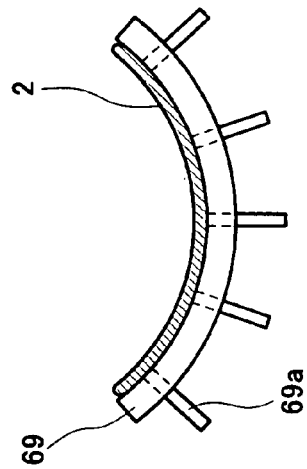
Fig. 1 8 (d)
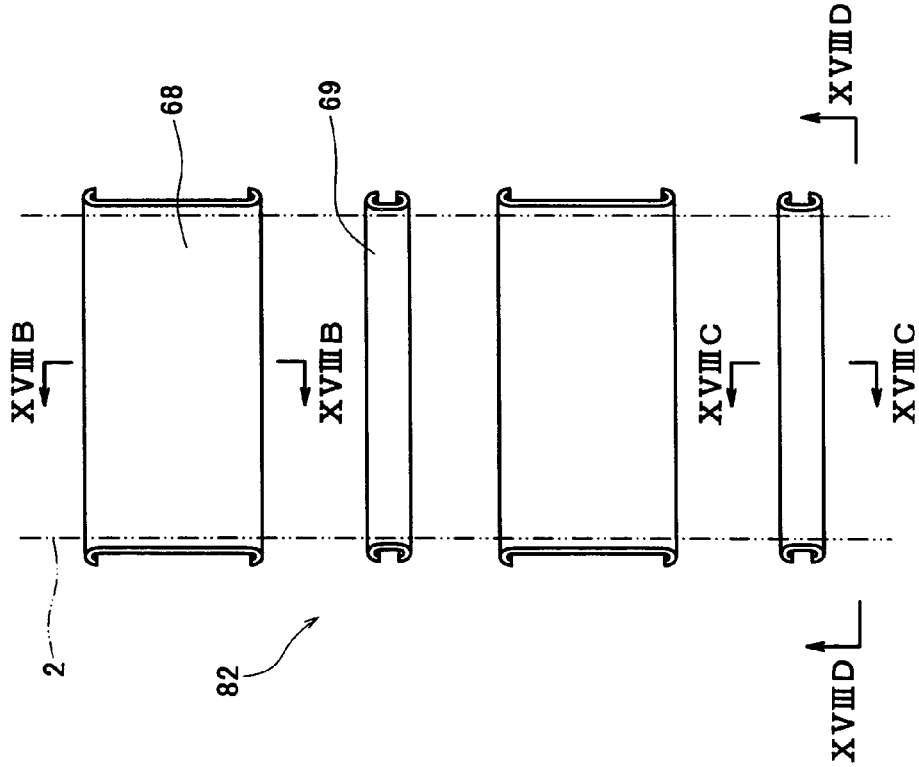
Fig. 1 8 (a)

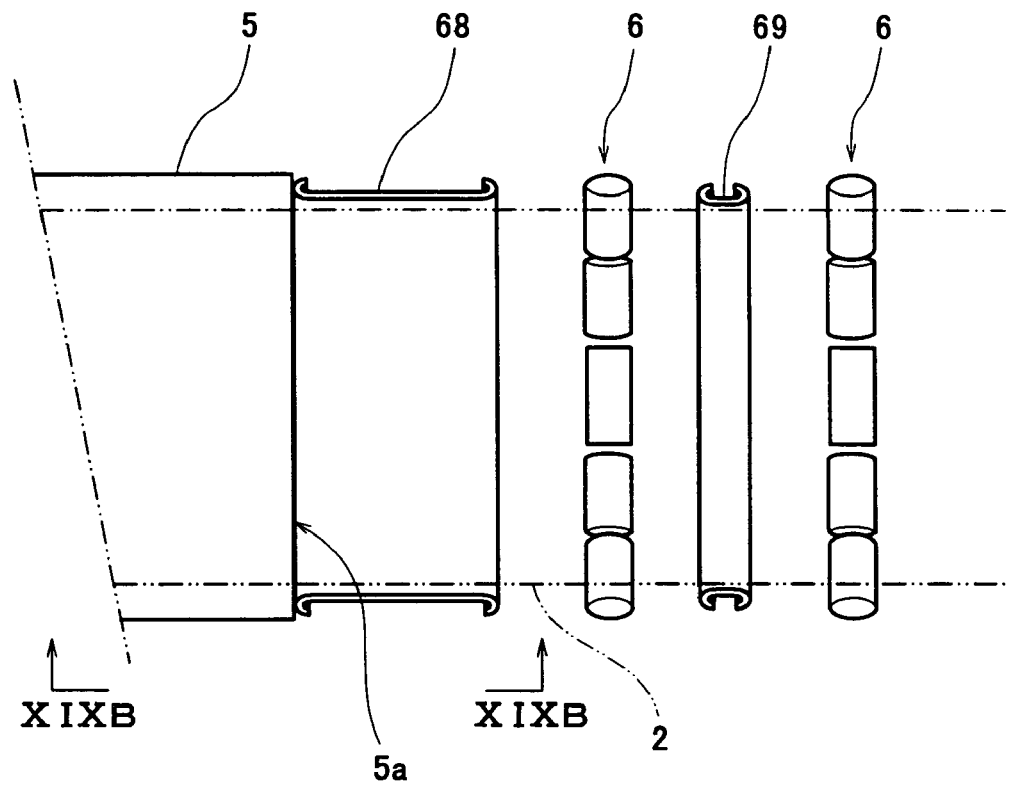
Fig. 1 9 (a)
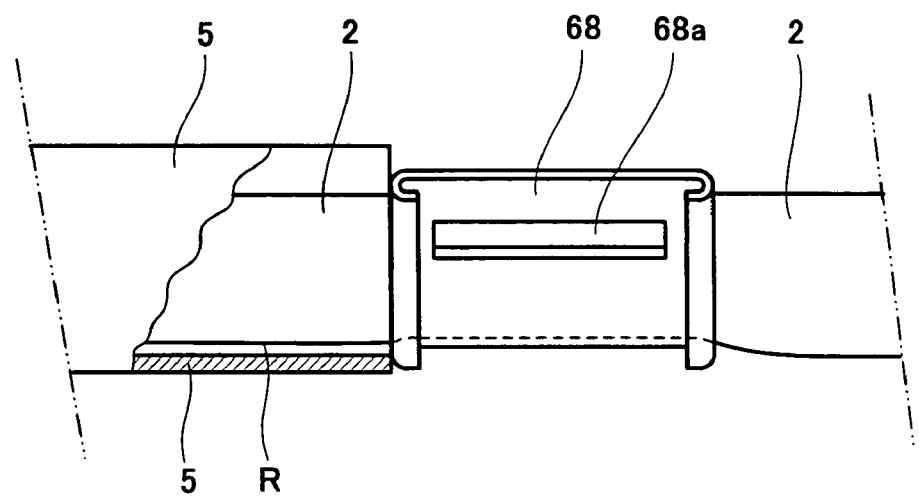
Fig. 1 9 (b)

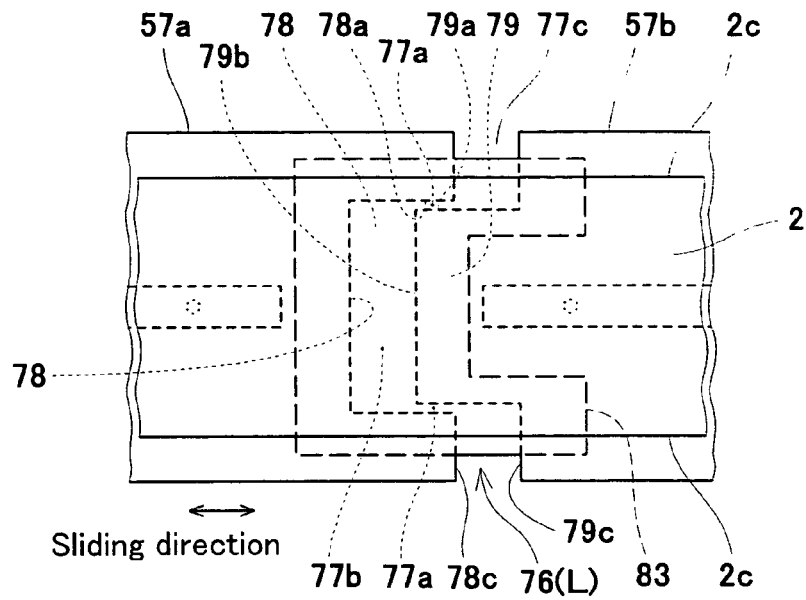
Fig. 2 1 (a)
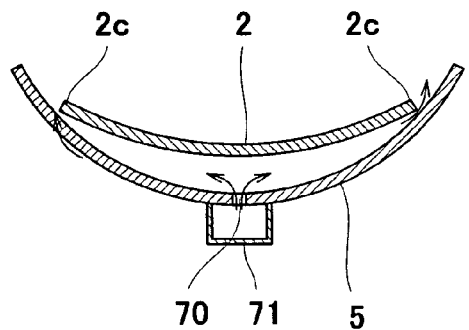
Fig. 2 1 (b)
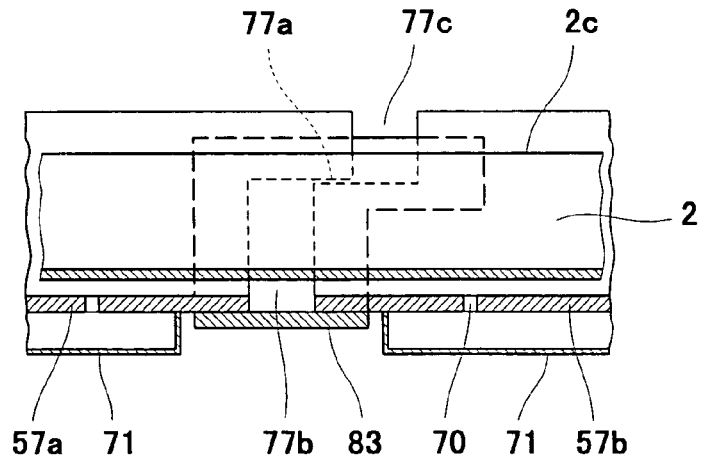
Fig. 2 1 (c)

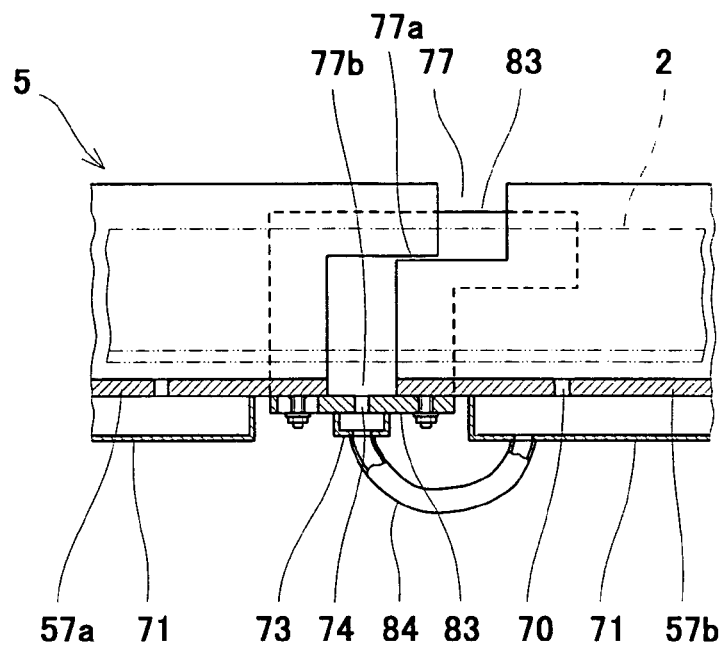
Fig. 2 2 (a)
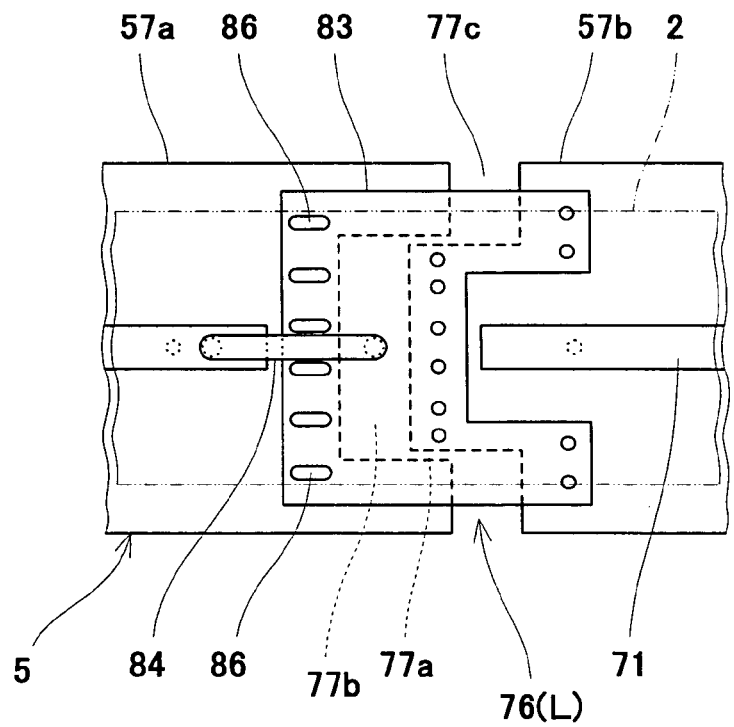
Fig. 2 2 (b)

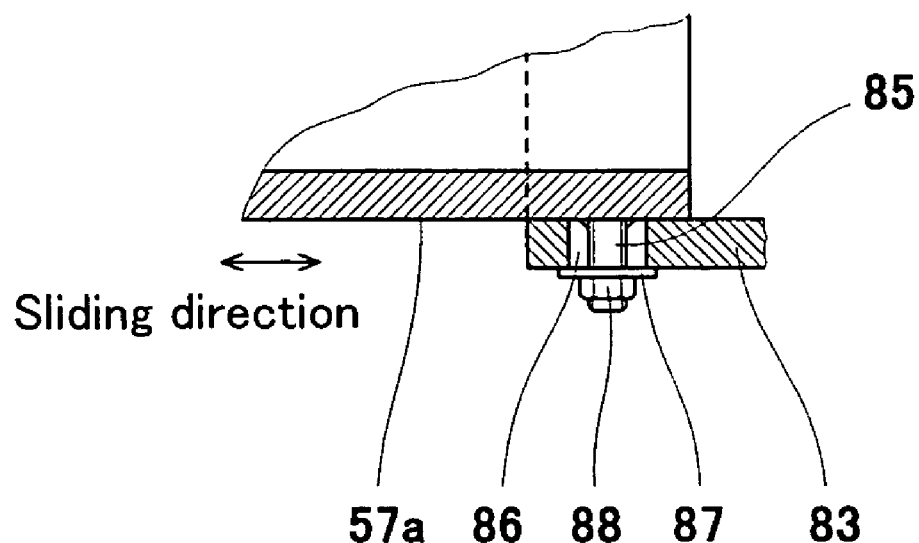
Fig. 2 3 (a)
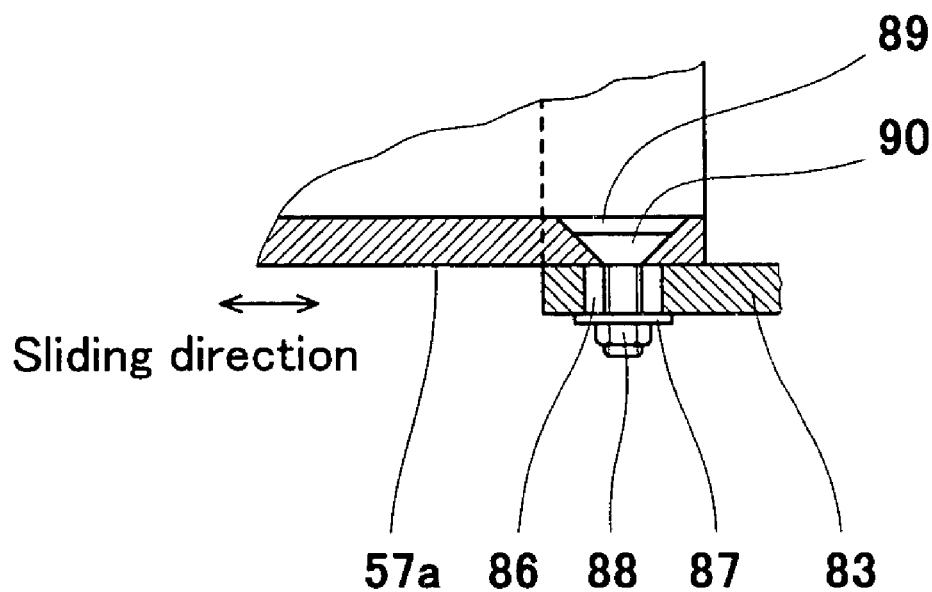
Fig. 2 3 (b)

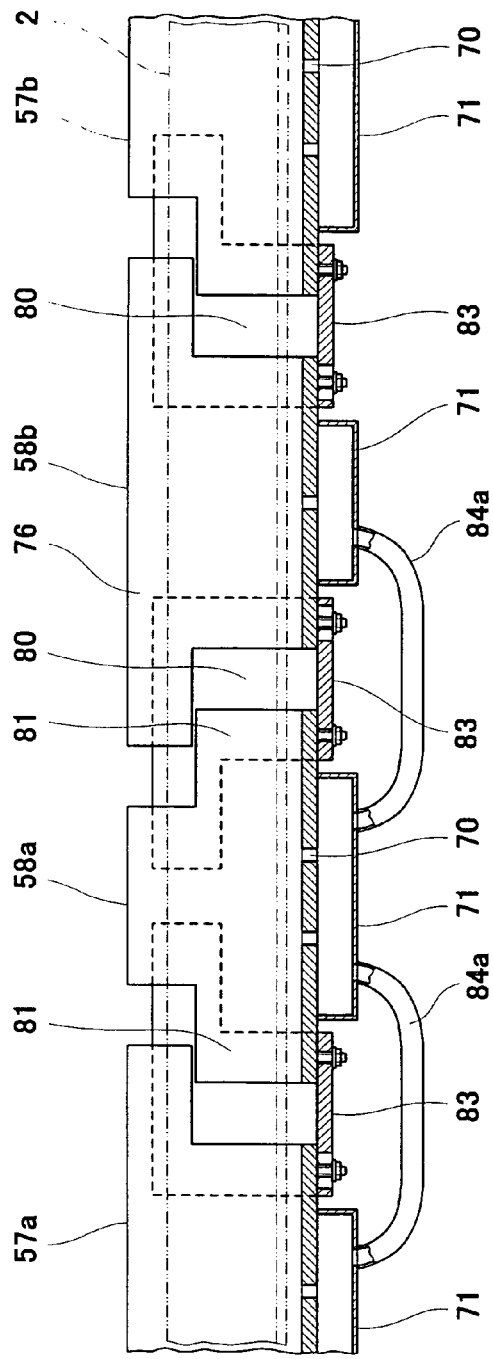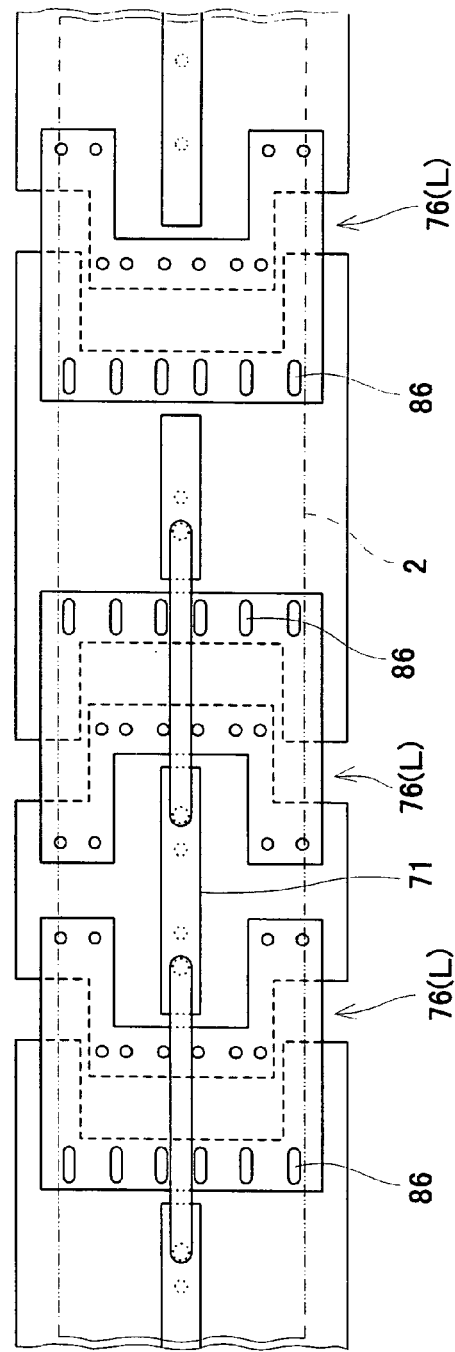
Fig. 24 (a)
Fig. 24 (b)

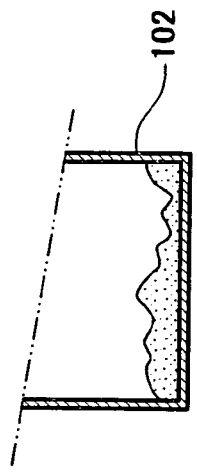
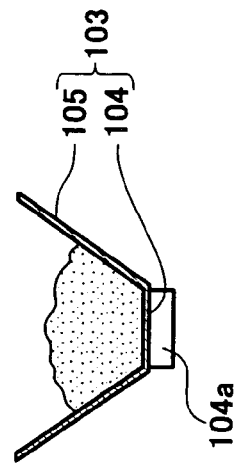
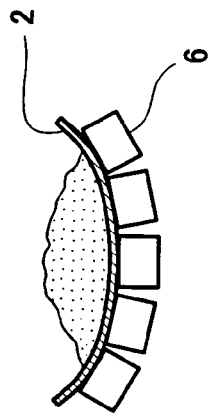
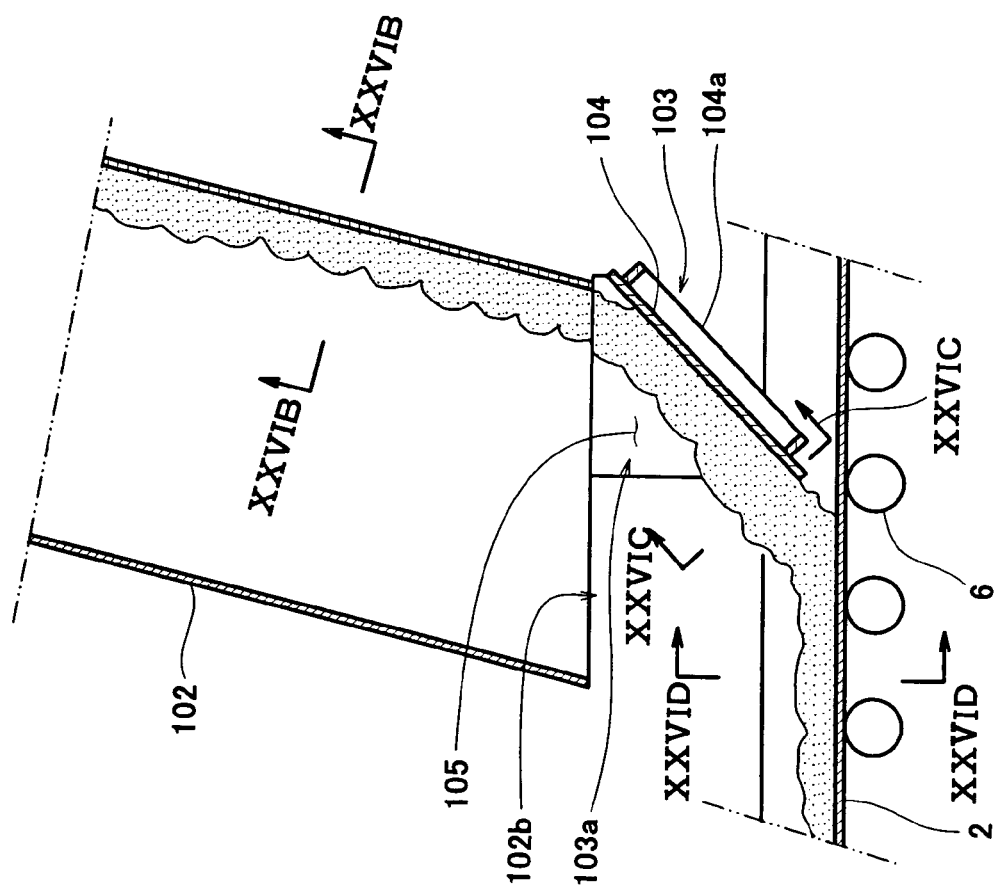

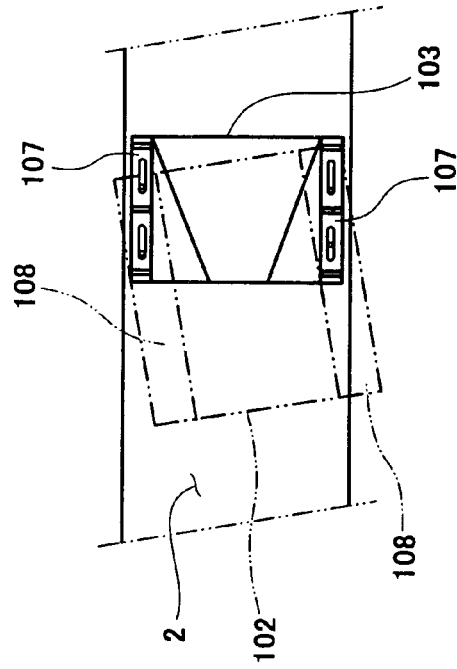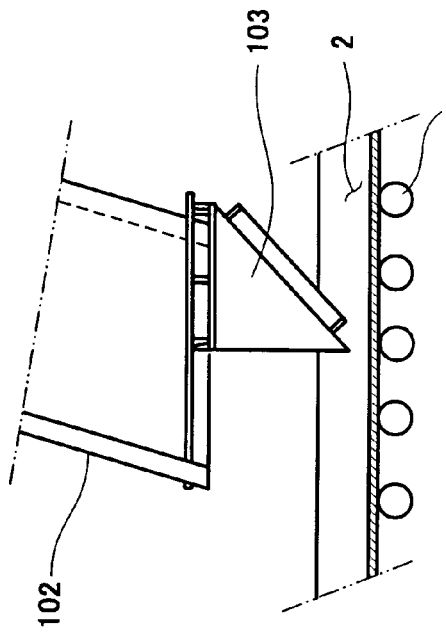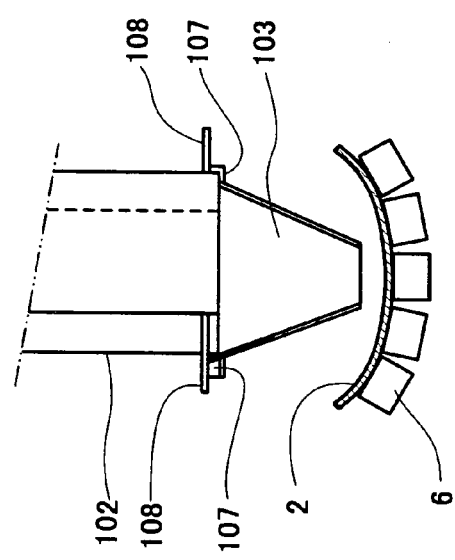

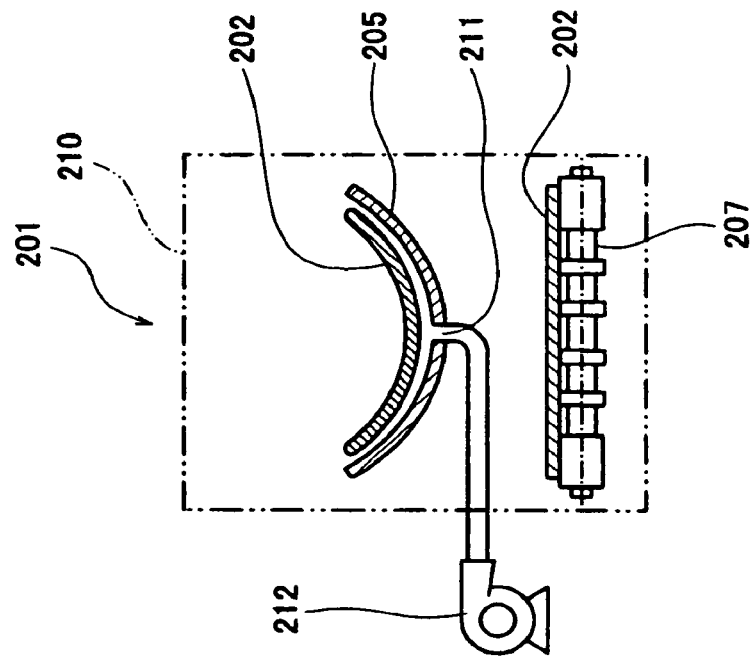
Fig. 31 (b) PRIOR ART
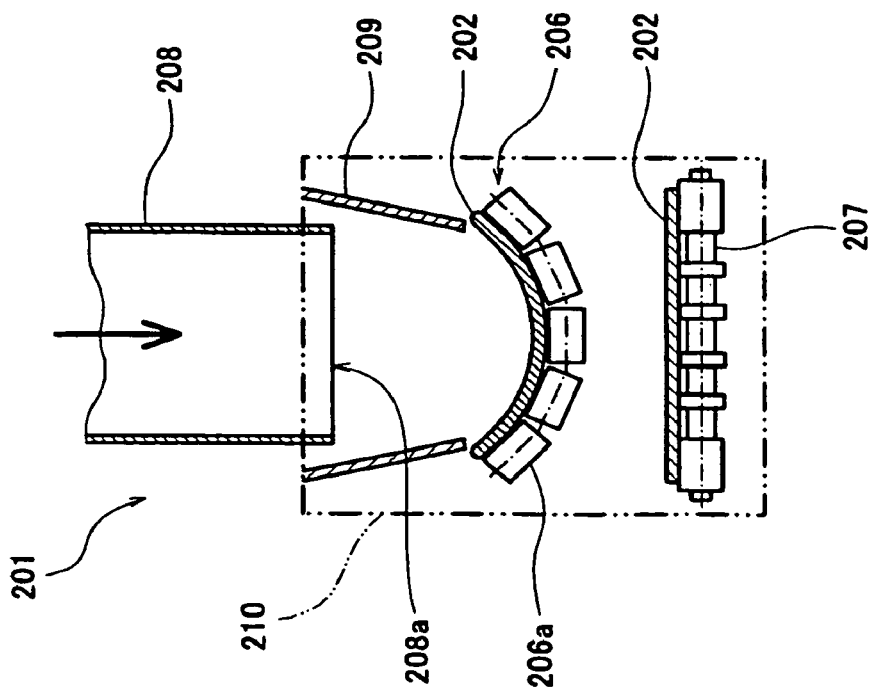
Fig. 31 (a) PRIOR ART

BELT CONVEYOR AND AUXILIARY EQUIPMENT THEREOF

TECHNICAL FIELD

The present invention relates to a belt conveyor and associated equipment. More particularly, the present invention relates to a belt conveyor provided with a carrying belt moving above troughs along their longitudinal direction, the troughs equipped on the belt conveyor, removers for removing residues of products adhering to the belt of the belt conveyor, and loading devices for loading the products on various conveyors.

BACKGROUND ART

FIG. 30 shows a conventional example of an air-cushion belt conveyor used in various industrial fields.

In the air-cushion belt conveyor (hereinafter simply referred to as a belt conveyor) 201, an endless belt (hereinafter simply referred to as a belt) 202 is installed around a pair of end pulleys 203, 204 provided at both ends of the belt conveyor 201 with their axes horizontally placed. The pulleys 203, 204 rotate toward a direction indicated by an arrow H in the Figure, thereby causing the belt 202 to circulate along a direction indicated by an arrow F. Troughs 205 (see FIG. 31) of circular-arc cross-section are provided close to the underside of a belt portion located on the upper side, i.e., forward (also referred to as outward) belt.

The belt 202 is generally comprised of a core body made of cotton, vinylon, nylon, polyester, steel code and the like, and rubber covering the core body.

Between the end pulley 203 on a trough entrance side and an entrance 205a of the trough 205, upper-stage support roller trains 206 such as trough rollers, impact rollers, or the like for supporting the forward belt 202 from below, are arranged. Each of the upper-stage support roller trains 206 forms a trough angle. Specifically, as shown in FIG. 31(a), the upper support roller train 206 is configured such that a plurality of rollers 206a are arranged in the shape of circular-arc to cause the belt 202 to be curved in the width direction as shown in FIG. 31(a) to thereby allow curvature of cross-section of the belt 202 to conform to that of the troughs 205 (see FIG. 31(b)). Meanwhile, below a belt portion under the troughs 205, i.e., a return (also referred to as homeward) belt, lower-stage support roller trains 207 comprised of flat rollers or the like for supporting the return belt portion to be flat are provided. In some cases, the lower-stage support roller trains 207 on the return side are also configured such that a plurality of rollers are arranged in the shape of circular-arc similarly to the forward trains. The upper-stage support roller trains 206 and the lower-stage support roller trains 207 are arranged as being spaced along the longitudinal direction of the belt 202.

As shown in a plan view of FIG. 32(a), the support rollers 206a in the respective upper-stage support roller trains 206 are arranged in such a manner that gaps G between the rollers are arranged on straight lines as seen from the longitudinal direction of the belt. The support rollers 207a in the lower-stage support roller trains 207 are arranged in the same manner, although this is not shown.

Therefore, the belt 202 is deformed by upward bending at positions corresponding to the gaps G between rollers along the longitudinal direction of the belt (see arrows in FIG. 32(b)). The deformation by bending is a characteristic in which once the belt is bent toward one direction, the resistive force to the bending toward the same direction is reduced even after the belt is restored to its original shape after the corresponding bending force is released. On the other hand, the resistive force is increased when the belt is bent toward the opposite direction to initial bending. This characteristic is believed to be attributed to visco-elasticity of rubber as a material of the belt 202.

Specifically, as shown in FIG. 32(b), the belt portion 202 on both sides around the gap G between adjacent rollers (represented by reference numeral 206a) as a center axis is upwardly bent. After this bending is released and a belt shape is thereby restored, the belt portion tends to be easily bent upwardly.

As a result, when this portion of the belt 202 moves up onto the trough 205, and is pushed up by compressed air, as shown in FIG. 32(c), the cross-section of the belt 202 in the width direction have corners C rather than smooth circular-arc (for easier understanding, the shape is exaggerated in the Figure). In order to prevent the corners C from making contact with the trough 205, it is necessary to increase an air pressure to thereby increase a floating force. This might cause an increase in the amount of air escaping from the side portions of the belt 202.

Meanwhile, between the end pulley 203 on the trough entrance side and the entrance 205a of the troughs 205, a shoot 208 is provided for dropping the products onto the belt 202. As shown in FIG. 31(a), the width of a lower end opening 208a of the shoot 208, i.e., the dimension of the lower end opening 208a in the belt width direction is set slightly smaller than the width of the belt 202. This is because the excess reduction of the width might cause the shoot 208 to get clogged with the products. Skirts 209 are provided on both sides of the belt 202 in the width direction in the vicinity of where the shoot 208 is provided, to prevent dropping of the products from the belt. The support roller train 206 provided under the belt portion at a position corresponding to the position of the shoot 208 functions as impact rollers 206 for receiving drop load of the dropped products. The impact rollers 206 are, as described above, configured such that, the plurality of rollers 206a are arranged in the shape of circular-arc to cause the belt 202 to be curved in the width direction to thereby allow curvature of cross-section of the belt 202 to conform to that of the troughs 205 (see FIG. 31(b)). A belt portion between the both end pulleys 203, 204 is surrounded by a duct 210.

As shown in FIG. 31(b), an air-supply hole 211 is formed at the bottom of the trough 205. For the purpose of floating the belt 202 above the trough 205, an air-supply device 212 is provided for injecting compressed air into between the belt 202 and the trough 205 through the air-supply hole 211.

It is preferable that, in the belt conveyor, in particular in the air-cushion belt conveyor, the products are evenly loaded in right and left direction with respect to a center portion on the belt portion in the width direction. This is because if the products are unevenly loaded in the width direction of the belt, the belt is likely to snake because of directional imbalance between the floating force of air and the gravity of the products above the trough. However, in the belt conveyor 201 provided with the shoot 208 having a large opening width, the products are unevenly arranged on the belt 202 depending on the state of the products dropping through the inside of the shoot 208, thereby causing the belt 202 to snake.

Accordingly, as a solution to this problem, belt conveyors have been proposed as disclosed in Japanese Laid-Open Patent Application Publication Nos. 7-125826, 9-169423. The belt conveyor comprises a sensor for detecting snaking of the belt, and a mechanism for pivoting a shoot or a damper at a lower end of the shoot in the width direction of the belt. With such a configuration, a detection signal of the snaking detection sensor is fed back to the shoot (damper) pivoting mechanism to change the positions of the products being loaded toward the direction for canceling the snaking. However, such a conveyor is complex in mechanism, and the number of parts is greatly increased.

In general, in the above-mentioned conveyor, when the belt 202 is curved by the upper support roller trains 206 to cause the cross-section of the belt 202 to conform in curvature to that of the trough 205, the belt is thereafter restored to a flat shape. As a result, when the belt 202 moves up onto the trough 205, both side portions of the belt 202 are brought into contact with the trough 205, and a space for compressed air for air-cushion is ensured between the belt 202 and the trough 205.

However, in the case where the belt 202 is moving while its both side portions are in sliding contact with the trough 205, friction resistance generated between the side portions of the belt and the trough becomes large and therefore is not negligible. As a result, it is necessary to select a driver which outputs a high power for rotatably driving the pulleys 203, 204. Further, the friction between the side portions of the belt 202 and the trough makes the life of the belt 202 shorter.

The trough of the air-cushion belt conveyor is provided with an extension/contraction allowance in the total length of the conveyor for absorbing thermal expansion, manufacturing error, installation error, etc, which are associated with the troughs.

FIGS. 33($a$), 33($b$), and 33($c$) are a plan view, a longitudinal sectional view, and a side cross-sectional view, respectively, showing a general connecting method of the troughs. The air-cushion belt conveyor is constituted such that air for air-cushion is supplied between the arc-shaped troughs 205 and the inwardly provided belt 202 from an air-supply chamber 213 under the trough 205 through the air-supply hole 211, thereby causing the belt 202 to float and move. When the troughs 205 form a long carrying path, a gap 214 is provided at the connecting portion between the troughs 205 as an extension/contraction allowance. A backing plate (guide plate) 217 is provided between adjacent troughs 205, for covering the gap 214, and a small air passage (groove) 218 is formed between the gap 214 between the troughs 205 and the surface of the backing plate 217.

For this reason, the air for air-cushion flowing between the belt 202 and the troughs 205 flows outward in the width direction of the troughs 205 along the air passage (groove) 218 and leaks outside at the side portions. As a result, the belt 202 is floating unstably, which increases a moving resistance. It is therefore necessary to enhance a capability of a blower and thereby increase a supply amount of the air for air-cushion.

Besides, when the troughs 205 are extended/contracted by heat or the like, and in this state, the troughs 205 slide, this causes change in the gap 214 between the trough 205, i.e., air passage (groove) 218; and hence change in leakage amount of the air for air-cushion leaking outside through the air passage (groove) 218. This leads to unstable flotation of the belt 202, which is brought into contact with the troughs 205, thereby resulting in an increase in a moving resistance.

Japanese Laid-Open Patent Application Publication No. Hei. 10-316244 discloses a technique in which, for the purpose of simplifying a connecting work of the troughs, a connecting guide member is protruded by a predetermined amount from a rear end face of one of the troughs, the other trough is positioned on the upper side of a connecting guide member, and bond is filled between end faces of these troughs. This prior art is disadvantageous in that the sliding of the trough extended/contracted due to heat is not permitted, although there are no grooves through which the air for air-cushion escapes.

The products adhere to the belt 202 and such residues are carried along with movement of the belt 202. Then, they drop, fly, or adhere around a return belt moving path, thereby causing contamination, corrosion, deposition, or change in moving resistance.

Accordingly, there has been conventionally proposed a device for removing residues on the belt on the return side. The residue removing means includes scraping by cleaners, or cutwater rollers (the roller adapted to press against the belt).

Publication of Unexamined Patent Application Publication No. Hei. 7-20767 discloses a blade constituting a scraper, which is mounted to extend in the width direction of the belt and to be adjustably positioned by rotation around an axis extending in the width direction of the belt. The blade is curved as having a distance from the axis increasing from both sides of the belt toward its center portion as seen from the width direction of the belt. When the blade rotates around the axis and its center portion in the width direction rises up with respect to the belt, this becomes an arch-shaped scraping portion for the belt. In accordance with this, even when the belt is deformed by the troughs in the shape of arch, i.e., deformed by bending, the scraping portion can be made into contact with the belt surface without gap between the scraping portion of the belt and the belt surface. As a result, the residues on the belt surface can be suitably scraped.

Japanese Laid-Open Patent Application Publication No. Hei. 6-271045 discloses that first to third processing rollers are rotatably provided in the vicinity of a terminal end portion of the belt conveyor, for guiding the belt inverted at the terminal end portion to snake. In accordance with this, while the belt inverted at the terminal end portion of the belt conveyor snakes through the first to third processing roller, the residues are pressed between the belt and the first processing roller into dehydrated and layered pieces, which are bent and cracked by the processing rollers, and the resulting layered broken pieces can be scraped and removed from the belt surface by bringing the third processing roller into contact with the belt.

Meanwhile, the belt is deformed by bending by the support roller trains. This is because, the cross-section of the belt is supported to be arch-shaped by the guide rollers having the trough angles as described above, for stably loading the products on the forward belt moving outward with the products loaded thereon.

Since each of the above means is adapted to remove the residues while keeping the cross-section of the belt in the shape of a straight line, the residue removing capability is high at the center portion of the belt but is low at the belt side portions due to the deformation by bending of the belt and reduction of the pressing force. In general, since the residues are less at the belt side portions than at the center portion, attention has been hardly focused on removal of the residues at the belt side portions. Under the circumstances, effective removing means has not been proposed.

DISCLOSURE OF THE INVENTION

The present invention is directed to solving the problem, and an object of the present invention is to provide a belt conveyor capable of obtaining sufficient air-cushion amount without increasing an air pressure by preventing occurrence of deformation of a belt by bending.

Another object of the present invention is to provide a conveyor capable of preventing uneven distribution of products and thereby preventing snaking of the belt, and a loading device used in the conveyor and a guide member therefor with a simple configuration.

Another object of the present invention is to provide a belt conveyor capable of significantly reducing friction resistance between side portions of the belt and a trough while ensuring a space of compressed air for air-cushion between the belt and the trough.

Another object of the present invention is to provide a trough of an air-cushion belt conveyor in which leakage of the air for air-cushion from a connecting portion between the troughs hardly occurs so that stable flotation and movement of the belt are reliably performed.

In addition, another object of the present invention is to provide a means for improving residue removing capability at side portions of the conveyor belt.

To solve the above-described problems, according to the present invention, there is provided a trough of an air-cushion belt conveyor, the belt conveyor being provided with interconnected troughs, characterized in that the troughs have a sliding structure with a gap between the troughs so as to be slidable in their longitudinal direction, and a seal mechanism capable of preventing leakage of air for air-cushion regardless of change in the gap due to sliding of the trough is provided at a connecting portion between the troughs.

With such a configuration, since leakage of the air for air-cushion is prevented during sliding of the trough, the amount of air supply can be reduced. Also, the flotation above the troughs stably occurs without insufficient supply of air for air-cushion at the connecting portion between the troughs, and the moving resistance can be reduced.

A trough of an air-cushion belt conveyor, the belt conveyor being provided with interconnected troughs, is characterized in that the troughs have a sliding structure with a gap between the troughs so as to be slidable in their longitudinal direction, and a labyrinth seal mechanism capable of preventing change in leakage amount of air for air-cushion regardless of change in the gap due to sliding of the trough is provided at the connecting portion between the troughs.

Thereby, since the amount of air supply can be reduced and the leakage amount of the air for air-cushion can be stabilized, the belt can float stably and the moving resistance can be reduced.

In this case, it is preferable that at the connecting portion between the troughs of the air-cushion belt conveyor, the troughs are fitted at their concave and convex portions with a gap in a direction in which the trough slides, thereby forming the sliding structure, and minute gaps parallel to the direction in which the trough slides are created during sliding of the trough, thereby forming the labyrinth seal mechanism. Since the provision of the labyrinth seal structure at the trough connecting portion can make the width of an air passage in a labyrinth portion constant regardless of change in the gap between the troughs, and hence, the leakage amount of the air for air-cushion can be made constant. As a result, floatation of the belt can be stabilized.

The minute gaps constituting part of the labyrinth seal mechanism are provided inwardly of belt side portions. Thereby, leakage of the air for air-cushion can be reliably prevented and the leakage amount of the air for air-cushion does not vary even during sliding of the trough.

When the sliding structure having the seal mechanism or the labyrinth seal mechanism is provided in multiple stages in the longitudinal direction of the troughs, the sliding amount of the trough can be increased. This makes it possible to absorb a large sliding amount occurring in the conveyor having a long carrying path.

In the above configuration, a guide plate may be provided at the connecting portion between the troughs, for guiding movement of the trough, and may be provided with an air-supply chamber for supplying air for air-cushion and an air-supply hole through which a gap for permitting sliding communicates with the air-supply chamber. This makes it possible that the air for air-cushion can be sufficiently ensured at the connecting portion between the troughs, and the corresponding belt portion stably floats.

The guide plate is fixed to one of the troughs, and the other trough is slidably engaged with the guide plate through an elongated hole or a large-diameter hole provided in the guide plate. This enables smooth sliding of the trough.

According to the present invention, there is provided a device for removing residues adhering to belt side portions on a return side of a conveyor belt, characterized in that cutwater rollers or scrapers are adapted to be pressed against the belt side portions to be bent toward an opposite direction to bending of the belt deformed by the bending on a forward side of the conveyor belt.

By removing the residues only at the belt side portions independently, the removal of the residues can be effectively accomplished without being affected by the deformation of the belt by bending and reduction of the pressing force. In addition, since the cutwater and scraping at the belt side portions in the width direction can be reliably performed, dropping water or powder receivers (hereinafter referred to as "water receivers") are installed only at the center portion of the belt in the width direction under the conveyor.

By arranging the cutwater rollers and the scrapers along a direction in which the belt moves, the removal of the residues at the belt side portions can be reliably performed.

When the belt on the return side has trough shape, the cutwater rollers or scrapers are adapted to be pressed against the belt side portions for pushing the belt side portions inwardly more than the trough shape to cause the belt side portions to be greatly bent. Thereby, the removal of the resides on the belt side portions can be effectively performed without reduction of the pressing force.

In this case, by arranging the cutwater rollers and the scrapers along the direction in which the belt moves, the removal of the residues at the belt side portions can be more reliably performed.

In the above configuration, water receivers are provided at a center portion of the belt over an entire conveyor. This achieves a simplified apparatus in a narrow space. Also, by providing straight-line shaped press rollers or belt cleaners in a width direction of the belt so as to be located downstream of the cutwater rollers or the scrapers in the direction in which the belt moves, the residues adhering to the center portion of the belt can be also removed, so that the residue removing capability is exhibited over the entire width of the belt.

According to the present invention, there is provided a guide member for a loading device, the guide member being placed at a lower end of a shoot provided above a carrying path of a conveyor and adapted to guide products onto a belt, the guide member comprising: a bottom plate provided as being inclined downwardly and forwardly and having a width decreasing toward its front, and side plates provided along both sides of the bottom plate.

According to the guide member, most of the products are loaded on the carrying path such as the belt from a front edge of the bottom plate having small width. Therefore, most of the products are gathered to the center portion in the width direction of the belt and evenly distributed in the lateral direction from the center portion as a crest of mountain. It should be appreciated that the guide member is located at the lower end of the shoot, although this may be installed at the lower end.

In the guide member, the both side plates extend outwardly and upwardly. Thereby, even the products dropping through the inside of the shoot in a dispersed state, are gathered naturally to the center portion by the both side plates.

The bottom plate and the side plates are continuously and integrally curved with a circular-arc-shaped horizontal cross-section having an average curvature increasing toward a carrying path face. This configuration is applicable to shoots of a circular cross-section or of an elliptical cross-section.

According to the present invention, there is provided a loading device for a belt conveyor, the loading device being adapted to load products on a carrying path of a conveyor, comprising: a shoot constituting a path through which the products drop; and one of the above-mentioned guide members provided to be located at a lower end of the shoot.

The loading device provides function and effects of the guide member of the present invention.

The both side plates of the guide member are mounted to a rear portion of both sides of an opening formed at the lower end of the shoot. Thereby, in addition to a front opening of the guide member, a front portion of the opening in the lower end of the shoot serves as an exit of the products from the shoot. Therefore, the shoot does not get clogged even when a great many products are dropping.

Also, a plurality of guide members are provided along a front and rear direction of the opening formed at the lower end of the shoot. Even when a great many products are dropping or the products are dropping through the inside of the shoot in a dispersed state, they are gathered naturally to the center portion of the carrying path by all the guide members.

The guide member is movably provided along the front and rear direction of the opening formed at the lower end of the shoot and is adapted to be fixed at a desired position. This allows the guide member to be adjustably positioned in the front and rear direction. Therefore, the guide member can be installed at the position where many of the products being dispersed and dropping through the inside of the shoot are gathered or many of the products dropping through the inside are gathered depending on an operation state.

According to the present invention, there is provided a conveyor comprising: a long carrying path moving with products loaded thereon; and one of the above-mentioned loading devices, provided above the carrying path, for loading the products on the carrying path.

In accordance with the conveyor, the snaking of the carrying path can be provided without a need to provide a complex mechanism such as a snaking detector of the belt or a pivoting device of the shoot, unlike the conventional conveyor.

In the conveyor, skirt members are vertically provided on both right and left sides of the carrying path over a front and rear range in which the loading device is located, and an upper end of the guide member is located below upper ends of the skirt members. This prevents lateral dropping of the products can be prevented. Also, the guide member can be mounted to the skirts.

As defined herein, "forward" in claims refers to the direction in which the belt moves and "rearward" in claims refers to its opposite direction.

According to the present invention, there is provided a belt conveyor comprising: troughs; a belt moving above the troughs along a longitudinal direction of the troughs; and belt bending members provided upstream of an entrance of the troughs such that the members are placed outside on both sides in a width direction of the belt, wherein the belt bending members are adapted to abut with both side portions of the belt to be upwardly bent (including bending toward the center of the belt in the width direction).

In accordance with the belt conveyor, since the both side portions of the belt are temporarily upwardly bent, these side portions of the belt are deformed by upward bending. That is, even after the belt shape is restored after the bending is released, the belt is easily bent upwardly. In other words, the belt has resistance force to upward bending less than that of an unbent belt. As a result, when the belt moves up onto the belt and the both side portions of the belt make contact with the trough, the friction resistance to the movement of the belt from the trough is reduced and a power of a driving source can be lessened. Thereby, equipment cost and operation cost can be reduced and the life of the belt can be prolonged.

As defined herein, based on the movement of the belt, "upstream" in Claims refers to an opposite side of downstream toward which the belt moves.

It is preferable that in the above belt conveyor, the belt bending member is adapted to move along a longitudinal direction of the belt so as to be close to or away from an entrance of the troughs and to be fixed at a desired position for the reason described below. Specifically, the circulating belt is bent and then the shape of the bent portion is gradually restored. It is preferable that when the belt moves up onto the trough, the belt is restored to substantially conform in shape to the cross-section of the trough. In accordance with the above constitution, for achieving desirable restoration at the entrance of the trough, the set position of the belt bending member can be adjusted at a proper distance from the entrance of the trough.

It is preferable that the belt bending member of the belt conveyor is comprised of rollers provided so as to be rotated by side portions of the moving belt, because resistance to the circulating belt is less.

It is preferable that the belt bending member of the conveyor belt is comprised of sliding members with which side portions of the moving belt are in sliding contact. This is because resistance to the belt is less similarly to the rollers, and maintenance becomes easy.

It is preferable that the belt conveyor further comprises first reactive force detectors for detecting a reactive force exerted by the belt with which the belt bending members abut. This is because the bending degree of minimizing moving resistance of the belt exerted by the trough and the reactive force from the belt can be detected and managed as parameters.

In the belt conveyor comprising second reactive force detectors provided independently of and apart from the belt bending members, for detecting a reactive force exerted by the belt in a state in which the belt bending members are in contact with the side portions of the belt, the bending degree of minimizing the moving resistance of the belt exerted by the trough can be known as well.

It is preferable that in the belt conveyor, the belt bending member is adapted to be displaced and fixed at a desired position to cause the side portions of the belt to be bent or the bent belt to be restored. This is because by displacing the belt bending member toward the above direction, desirable bending degree of the side portion of the belt can be selected. The desirable bending degree is bending which causes deformation minimizing resistance exerted by the trough.

It is preferable that the belt conveyor further comprises displacing devices for displacing the belt bending members to cause the side portions of the belt to be bent or the bent belt to be restored, wherein the displacing device is adapted to fix the belt bending member at a displaced desired position. Conveniently, the operation of the displacing devices eliminates the need for an operator to cause the belt bending member to move and fix the same according to displacement degree. The displacing device includes, an air cylinder, a hydraulic cylinder, a servo motor, ball screws, etc.

It is preferable that the belt conveyor comprises one of the first reactive force detectors and the second reactive force detectors, and the above-mentioned displacing devices, wherein the displacing device is adapted to displace the belt bending member according to a reactive force value detected by the one of the reactive force detectors, because effective bending can be automatically given to the belt.

According to the present invention, there is provided an air-cushion belt conveyor comprising: troughs; a belt caused to float above the troughs and move along a longitudinal direction of the troughs; and first support members provided outside of the troughs to support the belt from below, wherein a plurality of first support members are arranged as being spaced apart from each other along a longitudinal direction of the belt, each of the first support members comprises a plurality of support elements arranged in a width direction of the belt, and at least adjacent first support members are configured such that gaps between support elements are arranged so as not to be on straight lines as seen from the longitudinal direction of the belt.

In accordance with the belt conveyor, since the deformation of the belt by bending is unbent by the support member placed adjacently, influence of deformation by bending can be substantially eliminated and occurrence of corners of the belt being floated up can be suppressed.

It is preferable that in the belt conveyor, gaps between support elements in one first support member of all the first support members are arranged so as not to be on the same straight lines as gaps between support elements in the other first support members. Thereby, the deformation by bending is further reduced and points of the deformation by bending in the width direction of the belt are increased, so that corners are not formed in the belt.

It is preferable that the support elements are comprised of rollers attached rotatably around an axis in a width direction of the belt, because the resistance to the circulating belt is less.

It is preferable that the support elements are comprised of sliding members, because maintenance becomes easy because of absence of moving parts.

Or, one part of the support elements constituting all the first support members may be comprised of the rollers and the other part may be comprised of sliding members. That is, the rollers and the sliding members may coexist in the entire first support member. The rollers and the sliding members may be arranged at desired positions.

According to the present invention, there is provided an air-cushion belt conveyor comprising: troughs; a belt caused to float above the troughs and move along a longitudinal direction of the troughs; and second support members provided outside of the troughs to support the belt from below, wherein the second support members are comprised of sliding members extending continuously along a width direction of the belt.

In accordance with the belt conveyor, the deformation of the belt by bending can be prevented because of absence of the gaps.

In the belt conveyor, a plurality of second support members may be arranged as being spaced apart from each other along the longitudinal direction of the belt.

The air-cushion belt conveyor having the second support members may further comprise first support members provided outside of the troughs, for supporting the belt from below, the first support members being comprised of a plurality of support elements arranged in the width direction of the belt. Thereby, the deformation of the belt by bending can be effectively prevented.

In the air-cushion belt conveyor having the second support members, in which one of the second support members is provided in contact with an end portion of the trough, the second support member provides function for closing a space between the trough and the belt, escape of a compressed gas in this space can be suppressed. As a result, effective belt flotation can be obtained.

BRIEF DESCRIPTION OF THE DRAWINGS

FIG. 15(a) is a cross-sectional view taken along line XVA—XVA in FIG. 14 and FIG. 15(b) is a cross-sectional view taken along line XVB—XVB in FIG. 14;

FIG. 17(a) is a plan view showing main part according to another embodiment of the belt conveyor of the present invention, FIG. 17(b) is a cross-sectional view taken along line XVIIB—XVIIB in FIG. 17(a), and FIG. 17(c) is a view taken in the direction of arrows along line XVIIC—XVIIC in FIG. 17(a);

FIG. 18(a) is a plan view showing main part according to another embodiment of the belt conveyor of the present invention, FIG. 18(b) is a cross-sectional view taken along line XVIIIB—XVIIIB in FIG. 18(a), FIG. 18(c) is a cross-sectional view taken in the direction of arrows along line XVIIIC—XVIIIC in FIG. 18(a), and FIG. 18(d) is a view taken in the direction of arrows XVIIID—XVIIID in FIG. 18(a);

FIG. 19(a) is a plan view showing main part according to another embodiment of the belt conveyor of the present invention, and FIG. 19(b) is a partially broken cross-sectional view taken in the direction along line XIXB—XIXB in FIG. 19(a);

FIG. 21(a) is a plan view of a connecting portion of a sliding structure including a labyrinth seal structure of the present invention, FIG. 21(b) is a longitudinal sectional view showing a portion where an air-supply chamber is located, and FIG. 21(c) is a side cross-sectional view;

FIG. 22(a) is a side cross-sectional view showing a state in which the air-supply chamber is provided in a guide plate, and FIG. 22(b) is a rear view thereof;

FIG. 23(a) is a cross-sectional view showing an example of a stud bolt in a state in which a trough and a guide plate are slidably engaged through an elongated hole or the like, and FIG. 23(b) is a cross-sectional view showing main part showing an example of a flush bolt;

FIG. 24(a) is a side cross-sectional view showing an example in which the connecting portion of the sliding structure having the labyrinth mechanism is set in multi stages for increasing a sliding amount of the trough and FIG. 24(b) is a rear view thereof;

FIG. 26(a) is a side view showing a state in which products are traveling through a loading device in FIG. 1, FIG. 26(b) is a cross-sectional view taken along line XXVIB—XXVIB in FIG. 26(a), showing an inside of a shoot, FIG. 26(c) is a cross-sectional view taken along line XXVIC—XXVIC, showing an inside of the guide member, and FIG. 26(d) is a cross-sectional view taken along line XXVID—XXVID, showing above of the belt;

FIG. 27(a) is a front view showing another embodiment of the loading device of the present invention, FIG. 27(b) is a plan view thereof, and FIG. 27(c) is a side view thereof;

FIG. 31(a) is a cross-sectional view taken along line XXXIA—XXXIA in FIG. 30 and FIG. 31(b) is a cross-sectional view taken along line XXXIB—XXXIB in FIG. 30;

BEST MODE FOR CARRYING OUT THE INVENTION

Hereinafter, an embodiment of a belt conveyor and its associated equipment of the present invention will be described with reference to the accompanying drawings.

Figure 1:
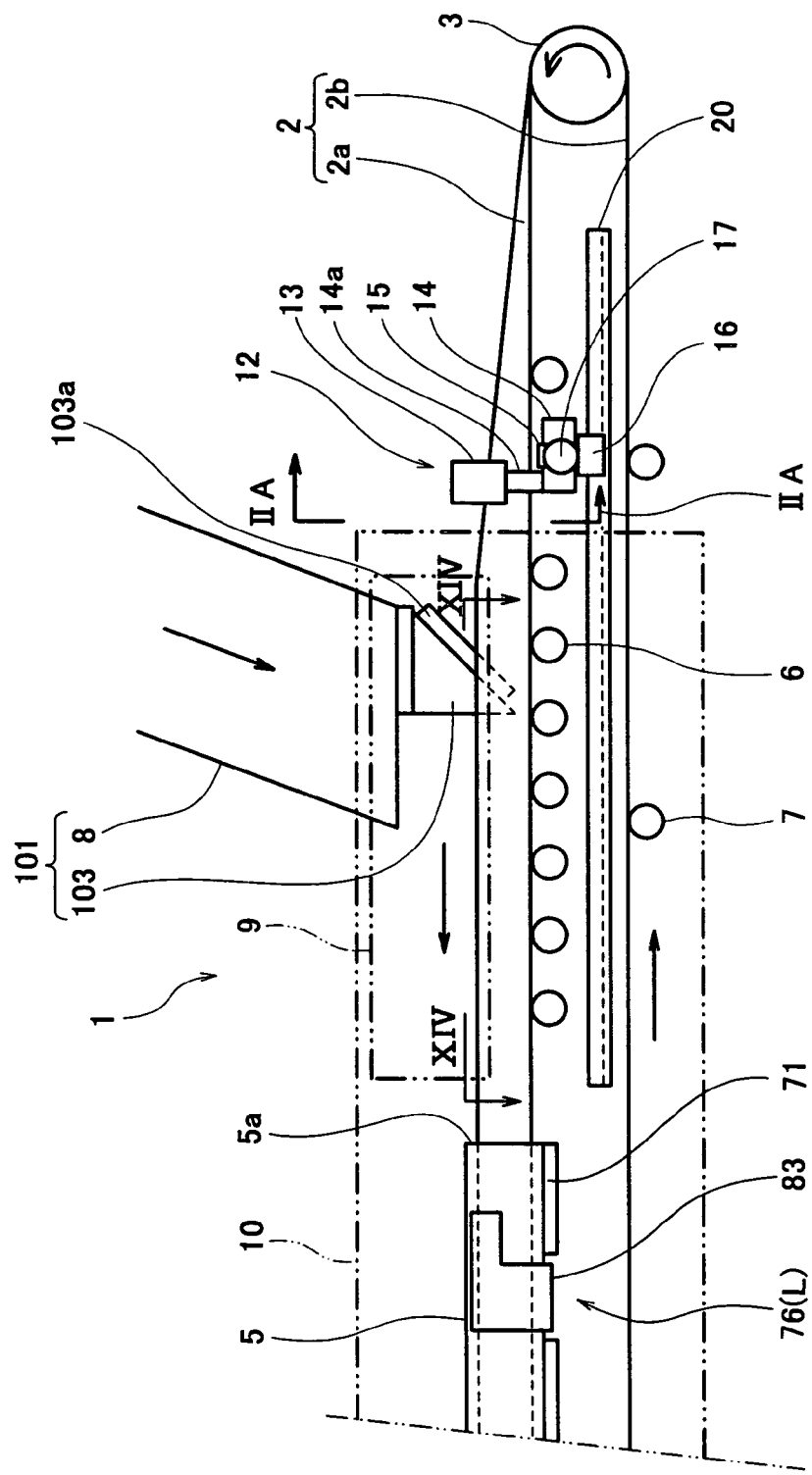
FIG. 1 is a side view showing an entrance-side pulley according to an embodiment of a belt conveyor of the present invention and its vicinity.
Figure 2:
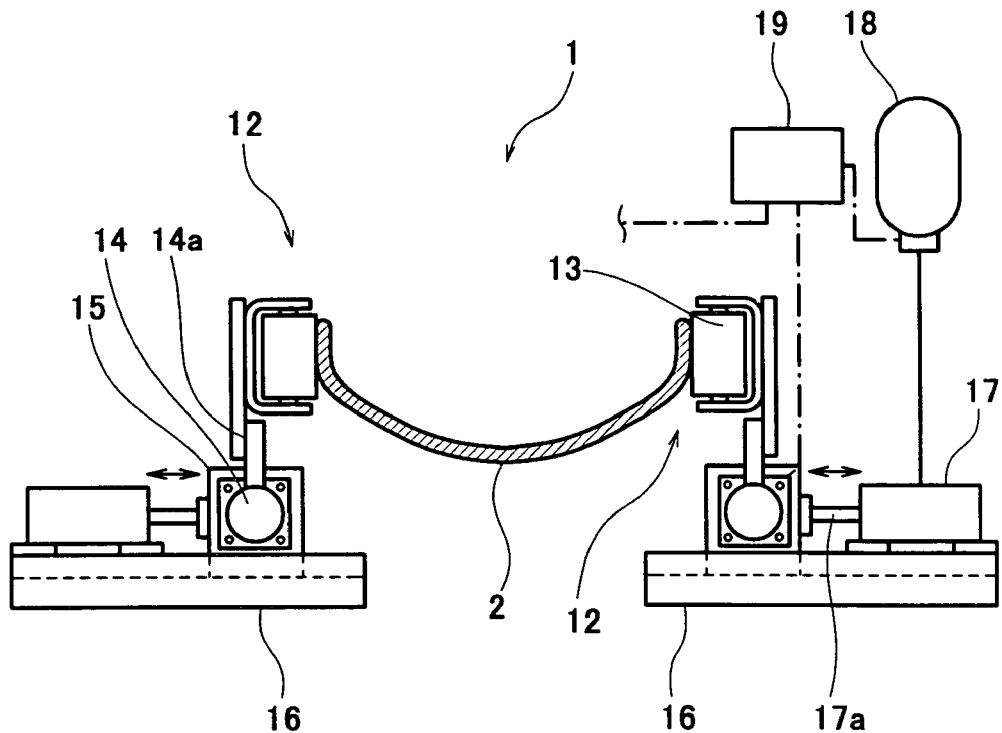
FIG. 2(a) is a cross-sectional view taken along line IIA—IIA in FIG. 1
FIG. 2(b) is a plan view of FIG. 2(a)
Figure 2:
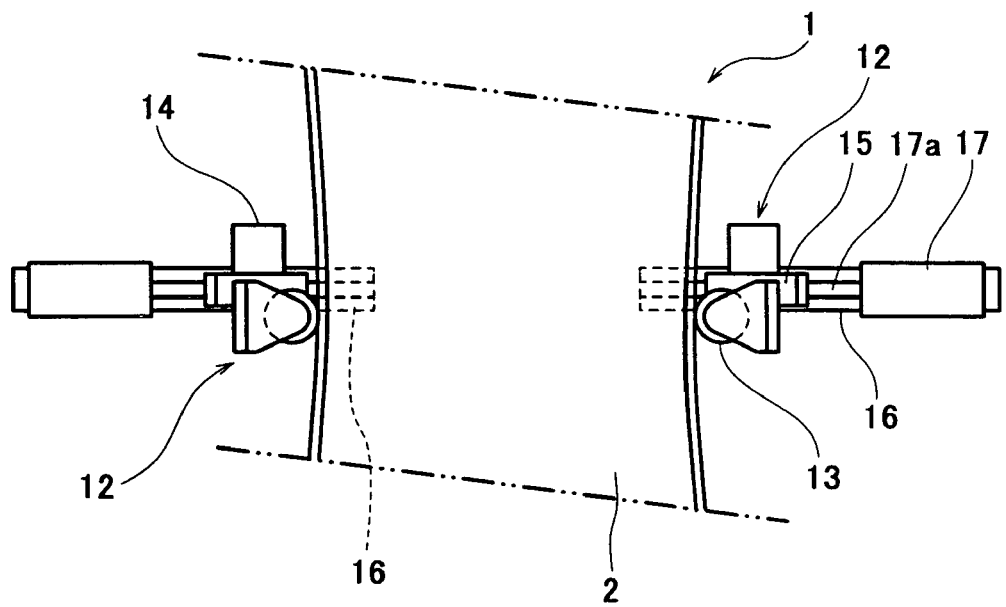
Figure 30:
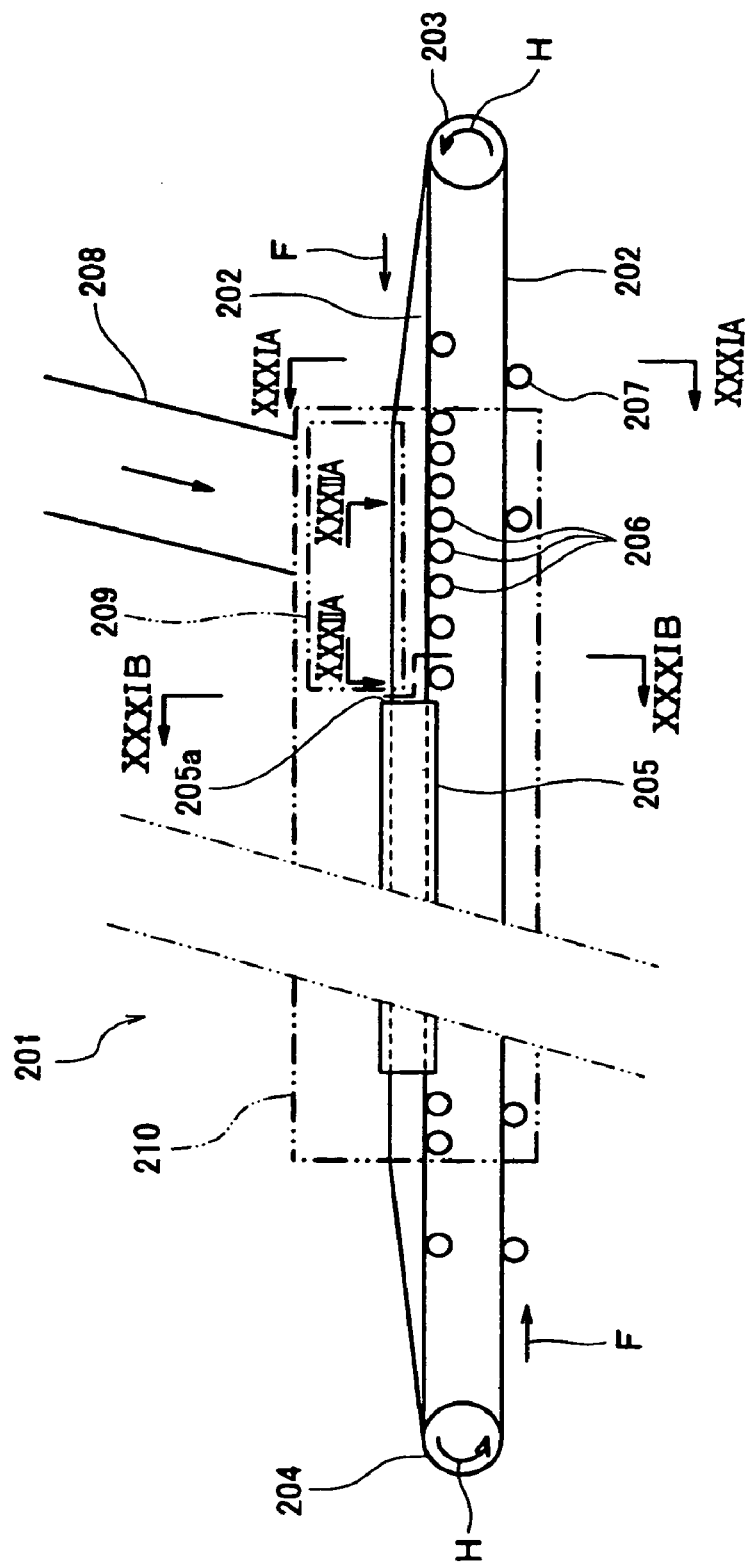
FIG. 30 is a side view showing an example of the conventional belt conveyor.

A belt conveyor 1 shown in FIGS. 1 and 2 has an entire configuration similar to that of the conventional air-cushion belt conveyor 201 shown in FIGS. 30 and 31. There is also provided an air-supply hole and an air-supply device for injecting compressed air between a conveyor belt (hereinafter simply referred to as a belt) and a trough 5 through the air-supply hole, although these are not shown. A first difference between the belt conveyor 1 and the conventional belt conveyor 201 is that a belt bending member 12 and a reactive force detector are provided on outside of each of both sides of the belt 2 in the width direction, between an entrance-side end pulley 3 and an entrance 5a of the troughs 5. A second difference is that a removing mechanism for removing residues adhering to the belt is provided on a return side of the belt. A third difference is a structure of a support member train (for example, roller train or slide member train) as a first support member, and a structure of a support slide member as a second support member. A fourth difference is a mechanism of a connecting portion between troughs. A fifth difference is that guide members 103, 115 for the products are provided at a position of a lower end of a shoot 8. Shoots 8, 102, 114 and the guide members 103, 115 constitute loading devices 101, 111, 113. Therefore, the same components as those of the belt conveyor 201 in FIGS. 30 and 31 and the corresponding functions will not be further described.

The belt bending members 12 are adapted to press both side portions of the belt 2 to be inwardly (upwardly) bent, thereby giving deformation by bending to the belt 2. The deformation by bending of the belt 2 is that once the belt is bent toward a direction, a resistive force to bending toward the same direction is reduced even after the belt 2 is restored to its initial shape (in general, flat). On the other hand, when the belt 2 is bent toward the opposite direction to the direction in which the belt is initially bent, the resistive force is increased. This characteristic is believed to be attributed to visco-elasticity of rubber as a material of the belt 2.

If the both side portions of the belt 2 are temporarily inwardly bent before the belt 2 enters the trough 5, utilizing this characteristic, then resistive force of the both side portions of the belt 2 in contact with the trough 5 with respect to inward bending is reduced even after its shape is restored, so that the belt 2 is easily bent inwardly. As a result, by action of the compressed air between the trough 5 and the belt 2 as well as the above characteristic, the friction resistance to the movement of the belt 2 is reduced, and a power of a drive source is lessened. This leads to reduced equipment cost and operation cost. Also, the life of the belt 2 can be prolonged.

The belt bending members 12 shown in FIGS. 1 and 2 are each constituted by an abutting roller 13 which abuts with a side of the belt 2. The abutting roller 13 is rotatably attached to a lever 14a of a known lever type load cell (hereinafter simply referred to as a load cell) 14 as a first reactive force detector. The load cell 14 is mounted to a mounting bracket 15. Guide rails 16 are installed in the width direction of the belt. The bracket 15 is engaged with the guide rail 16 so as to be movable close to or away from the side portion of the belt 2. The guide rails 16 are each provided with an air cylinder 17 as a displacing device in the vicinity of an outer end thereof as an end portion on the opposite side of the belt, and a tip end of a piston rod 17a of the air cylinder 17 is fixed to the bracket 15. The air cylinder 17 causes the bracket 15, and consequently, the abutting roller 13 to move close to or away from the side portion of the belt 2. The air cylinder may be replaced by a hydraulic cylinder, or otherwise a servo motor and ball screws or the like. Although the guide rails 16 are installed under the forward belt 2a, they are not intended to be limited to this configuration, but may be installed above the belt, i.e., on a ceiling side, and the bracket may be movably suspended.

In accordance with this configuration, the air cylinder 17 causes the abutting roller 13 to advance to thereby press the side portion of the belt 2 to be inwardly bent. In this case, the pressing force can be adjusted or released by advancement/retraction of the roller 13. When the abutting roller 13 presses the side portion of the belt 2 to be bent, the load cell 14 detects a reactive force exerted by the belt.

A control device 19 is connected to an air-supply source 18 of the load cell 14 and the air cylinder 17. According to a reactive force value detected by the load cell 14, the control device 19 controls the amount of compressed air to be supplied to the air cylinder 17, thereby adjusting the pressing force to the belt 2 by the butting roller 13. This configuration allows the pressing force to the belt by the abutting roller 13 to be automatically adjusted to be in a predetermined proper pressing force range. The proper pressing force range can be known when test operation of the belt conveyor 1 is carried out. One standard is a driving force (power consumption or the like of the driving source) for circulating the belt.

In the above embodiments, the air cylinder 17 is used to cause the abutting roller 13 to move in straight line so that the pressing force to the belt by the abutting roller 13 is changed, but this configuration is only illustrative.

For example, the load cell 14 is rotatably mounted to the bracket 15. Then, a body of the load cell 14 is rotated to be fixed at a desired angle of the lever 14a around the body. To be specific, a cylindrical clamp which is not shown is fixed to the bracket 15, and the body of the load cell is inserted into the clamp, to be clamped and fixed. In order to rotatably displace the load cell, the clamp is loosened. This can vary bending amount, although the direction toward which the side portion of the belt is bent is varied. Alternatively, the rotational displacement and the straight-line displacement may be combined.

Figure 3:
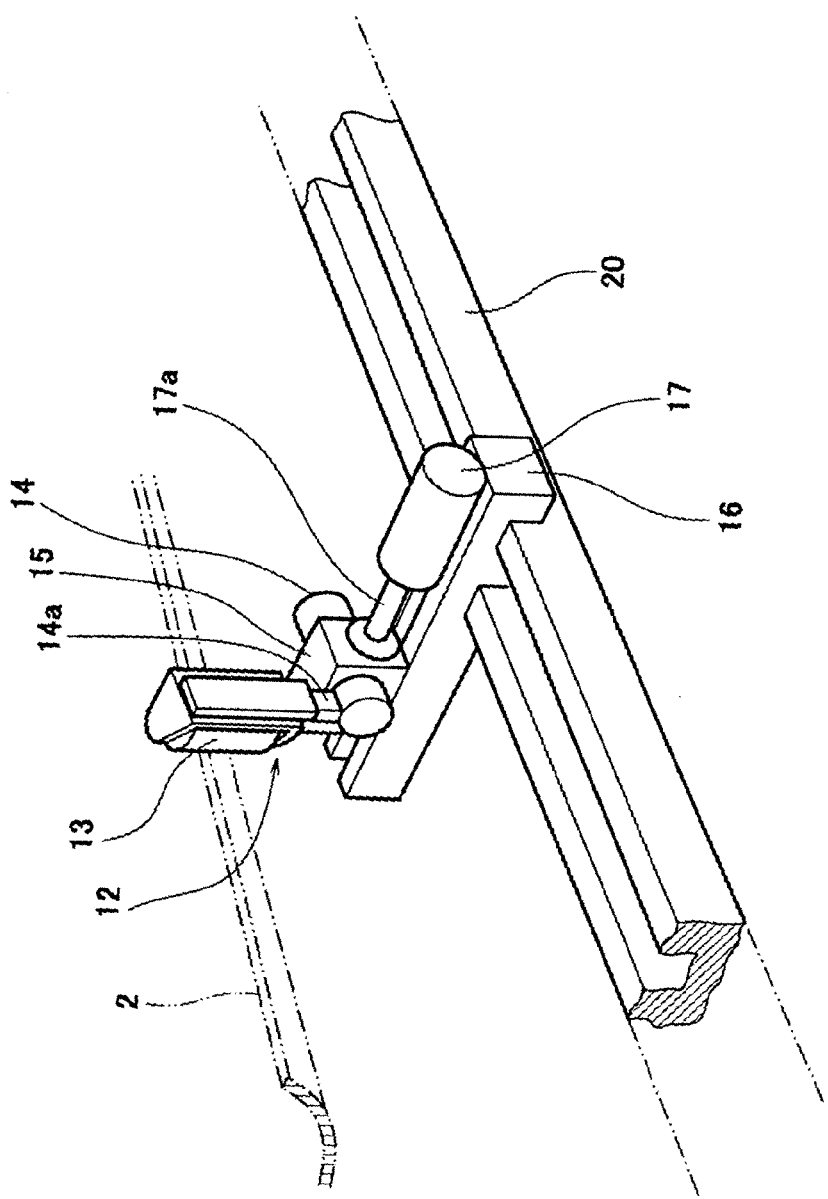
FIG. 3 is a perspective view showing a mechanism for moving an abutting roller and a reactive force detector in the belt conveyor in FIG. 1.

As shown in FIGS. 1 and 3, from a vicinity of the entrance-side pulley 3 to a vicinity of the entrance 5a of the trough on both sides of the belt conveyor 1, rails 20 are installed in parallel with the longitudinal direction of the belt 2. The rails 20 may be provided on an inner surface, an outer surface or the like of the duct 10. The guide rails 16 are movably engaged with the rails 20 and fixed at a desired position on the rails 20. Therefore, the abutting rollers 13 are capable of pressing the side portions of the belt to be bent at a desired position in a range from the vicinity of the entrance-side pulley 3 to the entrance 5a of the trough. The movement of the guide rails 16 is achieved by rotating ball screws which are not shown by using a motor which is not shown, or otherwise by an operator. When the guide rail 16 moves, the air cylinder 17 causes the abutting roller 13 to retract under control of the control device 19. Thereafter, under control of the control device 19, the ball screw rotates to cause the guide rail 16 to move. The guide rails 16 are placed so as not to interfere with the upper support roller trains 6, i.e., below or outside of the upper support roller trains 6.

The circulating belt 2 is bent by the abutting rollers 13 and thereafter, the shape of the bent portion is gradually restored. It is desirable that when the belt 2 enters the trough 5, the shape be restored so as to substantially conform to a curvature of a circular-arc cross-section of the trough 5. In accordance with the configuration, the set position of the abutting rollers 13 can be adjusted to be properly distant from the entrance 5a of the trough to achieve desirable restoration at the entrance 5a of the trough. The proper distance can be known when the test operation of the belt conveyor 1 is carried out. One standard is a driving force (power consumption or the like of the driving source) for circulating the belt.

In the above embodiment, the load cell 14 as the first reactive force detector is provided to function through the abutting roller 13. But, the present invention is not limited to this configuration. For example, the abutting roller 13 may be rotatably mounted to the mounting bracket without the load cell 14 and second reactive force detectors may be provided to abut with side portions of the belt at another position.

Figure 4:
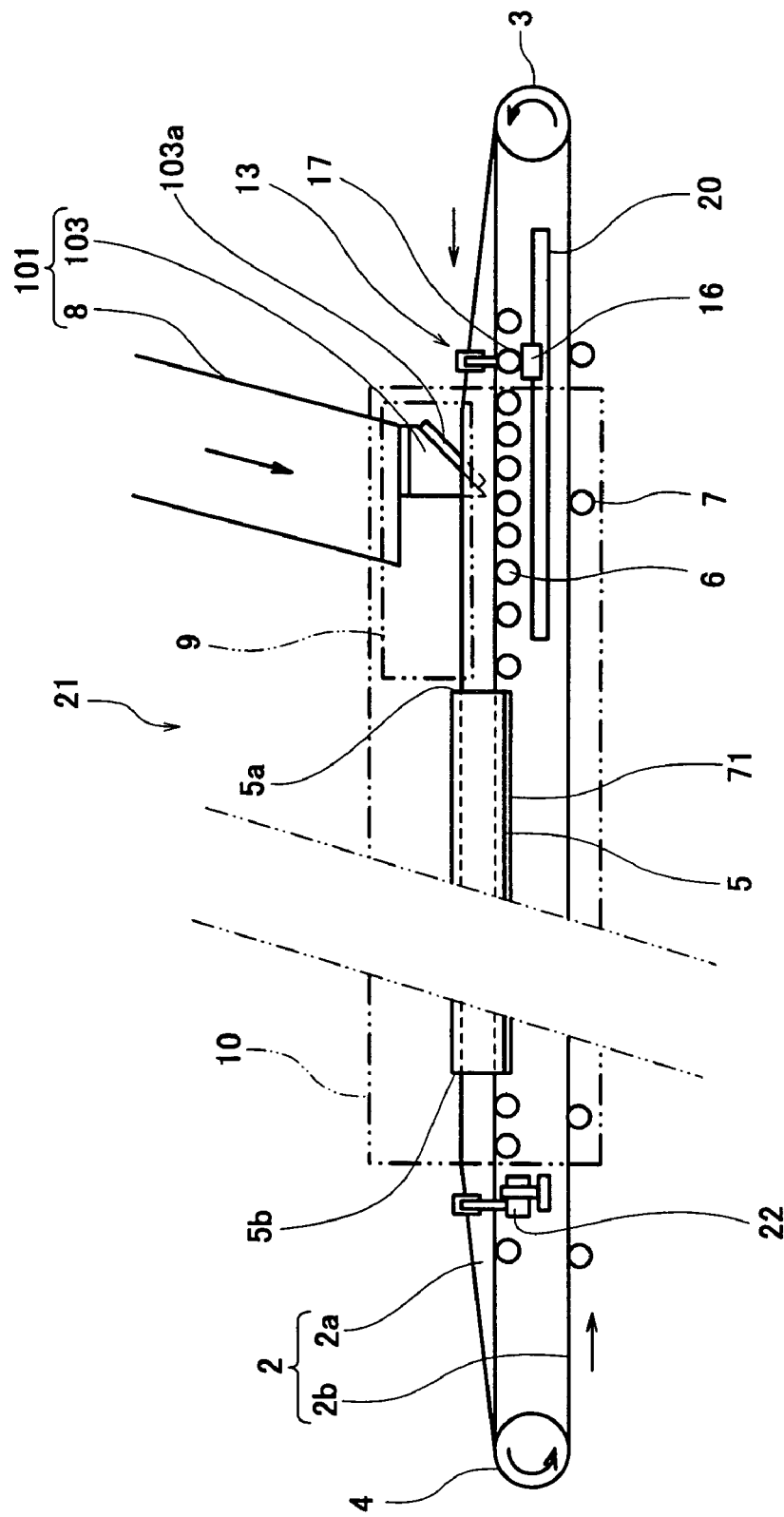
FIG. 4 is a side view showing another embodiment of the belt conveyor of the present invention.

FIG. 4 shows such a belt conveyor 21. In the belt conveyor 21, load cells 22 as the second reactive force detectors are provided in the vicinity of an exit 5b of the trough so as to be in contact with the belt 2 exiting from the exit 5b. That is, the load cells 22 are provided independently of the abutting rollers 13.

And, the control device 19 (FIG. 2(a)) connected to the air-supply source 18 of the load cell 22 and the air cylinder 17 is adapted to control the amount of compressed air to be supplied to the air cylinder 17 according to the reactive force value detected by the load cell 22, thereby adjusting the pressing force to the belt 2 by the abutting roller 13. The resistance force to bending of the belt 2 at the exit 5b of the trough is fed back to allow the pressing force to the belt by the abutting roller to be automatically adjusted to be in a proper pressing force range. The proper pressing force range can be known when the test operation of the belt conveyor 1 is carried out. One standard is a driving force (power consumption or the like of the driving source) for circulating the belt.

The mounting position of the load cells 22 as the second reactive force detectors is not limited to the vicinity of the exit of the trough 5. For example, the load cells 22 may be mounted in the vicinity of the entrance 5a of the trough. In brief, the load cells 22 are provided so as to abut with the belt 2 independently of the abutting rollers 13.

Figure 5:
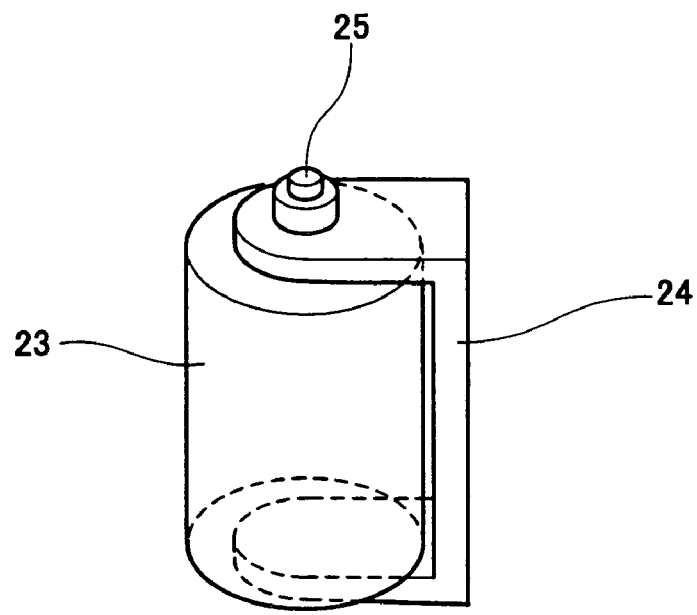
FIG. 5(a) is a perspective view showing another example of a belt bending member in the belt conveyor in FIG. 1
FIG. 5(b) is a partially cutaway perspective view showing another example of the belt bending member.
Figure 5:
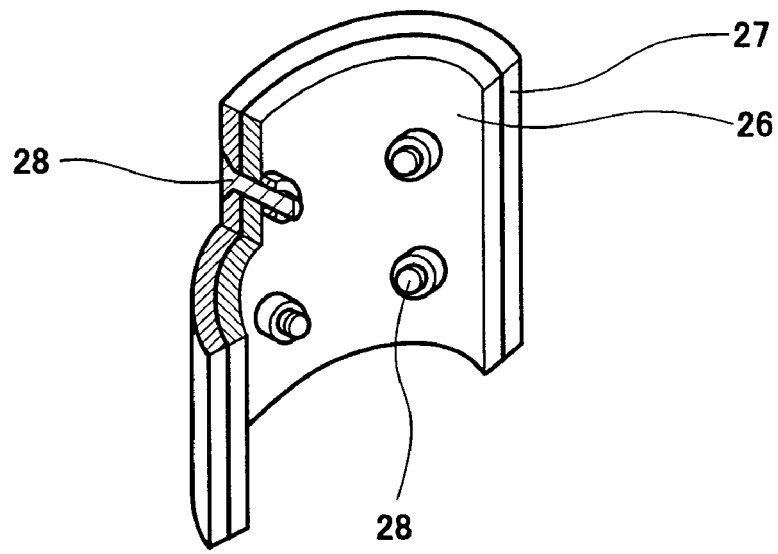

While in the above embodiment, the rotatable rollers are used as the belt bending members, the bending members are not limited to the rollers in the present invention. For example, a sliding member made of synthetic resin or the like that has low friction coefficient and wear resistance, such as super-polymer polyethylene may be used. The shape of the sliding member can be selected from various shapes. For example, as shown in FIG. 5(a), a cylindrically molded sliding member 23 may be used. As shown in FIG. 5(a), the cylindrical sliding member 23 is mounted such that upper and lower ends thereof are removably attached to a U-shaped holder 24 by means of a bolt 25 or the like, and approximately at a right angle with respect to the side portion of the belt. Or, another known method may be employed. Alternatively, as shown in FIG. 5(b), a partially cylindrical sliding member 27 may be mounted so as to conform to a belt-side face of a partially cylindrical bracket 26 made of metal or synthetic resin. It is preferable to use a flush screw 28 when mounting the sliding member 27 to the bracket 26, because a head of the screw is not exposed from the sliding member 27.

In the above embodiment, the belt bending members and the reactive force detectors are provided for the forward belt, i.e., the upper belt moving to the left in FIG. 1. Alternatively, they may be provided for the return belt, i.e., the lower belt moving to the right in FIG. 1. This is because if the troughs are provided for the return belt, then the friction resistance to the belt is effectively reduced by providing the belt bending members and the reactive force detectors.

Figure 6:
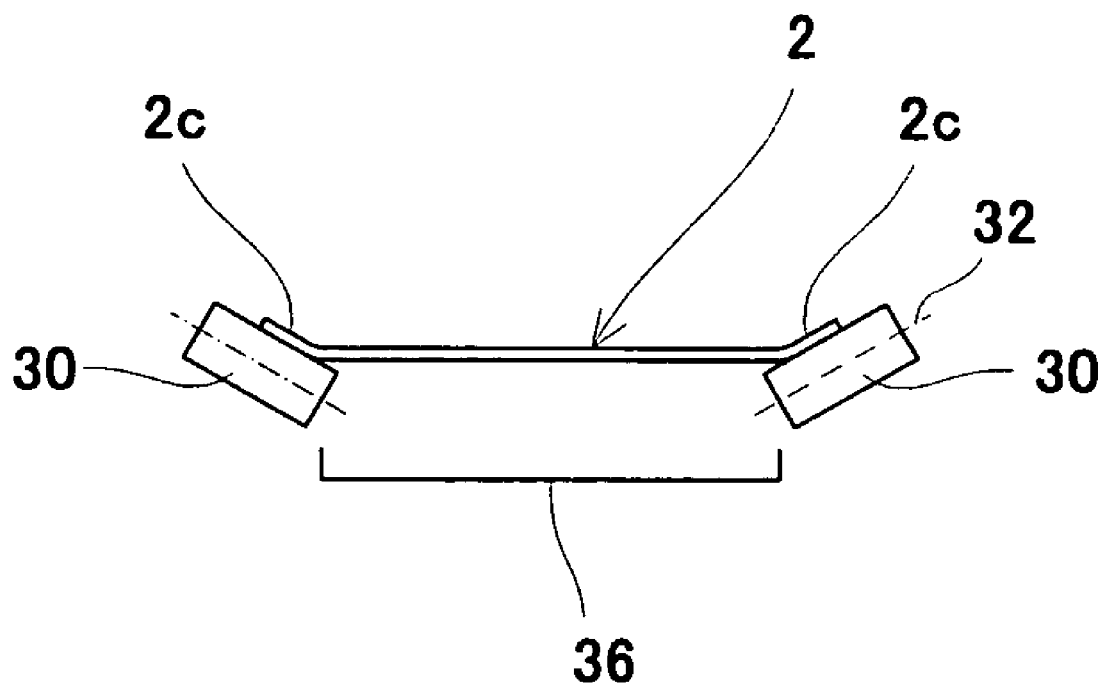
FIG. 6 is a view showing a principle according to the present invention for improving a residue removing capability at belt side portions.
Figure 7:
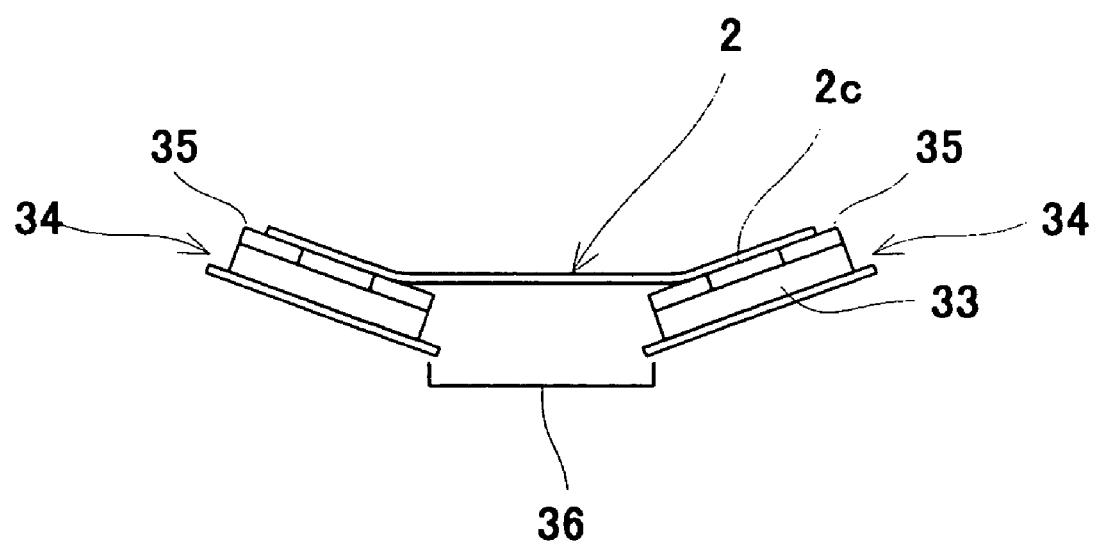
FIG. 7 is a view showing another principle according to the present invention for improving the residue removing capability at the belt side portions.

FIGS. 6 and 7 show principles according to the present invention, for improving residue removing capability at belt side portions. In these Figures, part of the return-side belt is partially shown.

FIG. 6 shows that cutwater rollers 30 are adapted to press against side portions 2c of the belt 2 on the return side of the belt 2. The cutwater roller 30 is provided to push up the side portion 2c of the belt by a constant pressing force such that its axis 32 is directed obliquely, i.e., in the direction orthogonal to the direction in which the belt moves as seen in a plan view (direction orthogonal to a cutaway surface of the Figure). The cutwater roller 30 is rotatable around the axis 32 with movement of the belt 2 in contact with the cutwater roller 30.

The cutwater roller 30 presses against the side portion 2c of the belt to be supported in a bent state. The side portion 2c of the belt is bent toward the opposite direction to the direction toward which the center portion of the outward (forward) belt is bent and deformed in U-shape because the forward belt is supported in the configuration of trough. By bending the belt toward the opposite side, the cutwater rollers 30 can be reliably pressed against the side portion 2c of the belt without a decrease in the pressing force, and scraping of the residues adhering to the side portion 2c of the belt is facilitated. The scraped and dropping products or water is up onto a dropping or powder receiver (water receiver) 36.

FIG. 7 shows that the cutwater rollers 30 are replaced by cleaners 34 provided at both side portions of the belt 2. The cleaners 34 are each configured such that a plate-shaped scraper 35 is attached to an upper end portion of a holding member 33. The scraper 35 is pushed up against the belt 2 from below, thereby allowing the side portion 2c of the belt to be bent toward the opposite direction to the deformation by bending as described above.

Only the cutwater rollers 30 or the scrapers 34 may be provided, or the cutwater rollers 30 and the scarpers 34 may be arranged along the direction in which the belt moves, so that the residues adhering to the side portion 2c of the belt can be effectively removed.

Figure 8:
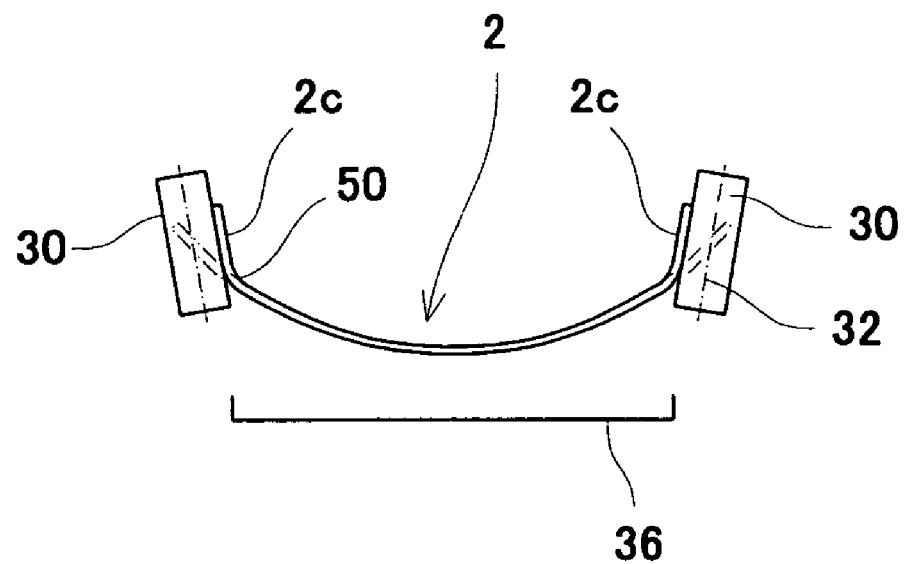
FIG. 8(a) is a front view showing a state in which the belt side portions are bent further inwardly by cutwater rollers than the conventional belt portion in trough shape when a return belt has trough shape.
FIG. 8(b) is a side view.
Figure 8:
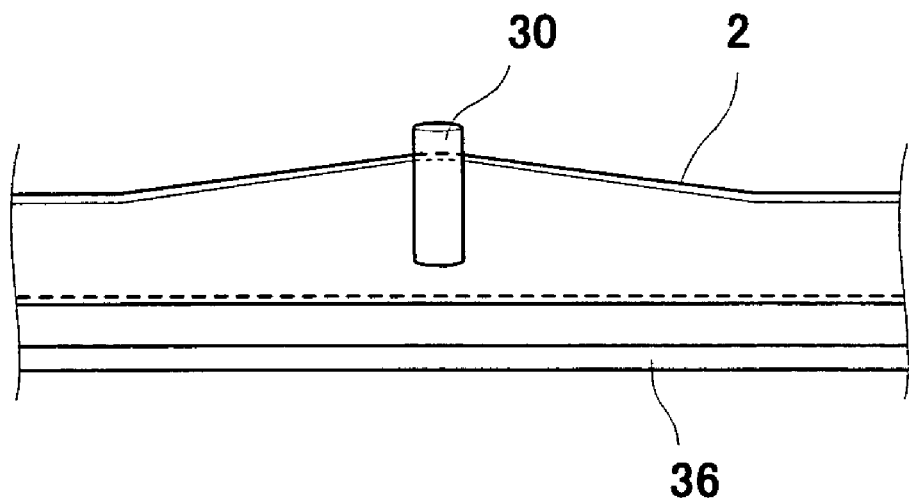

In the above example, the return belt is flat. As shown in FIGS. 8(a) and 8(b), when the return belt 2 has trough shape, the side portion 2c of the belt is inwardly bent more than that of normal trough shape (shape having a certain curvature radius as indicated by an imaginary line in FIG. 8(a)) so as to be greatly bent as having an inflection point 50 in the vicinity of the side portion 2c of the belt. By greatly bending the belt in trough shape, the residues adhering to the belt side portions can be effectively removed without a decrease in the pressing force.

Figure 9:
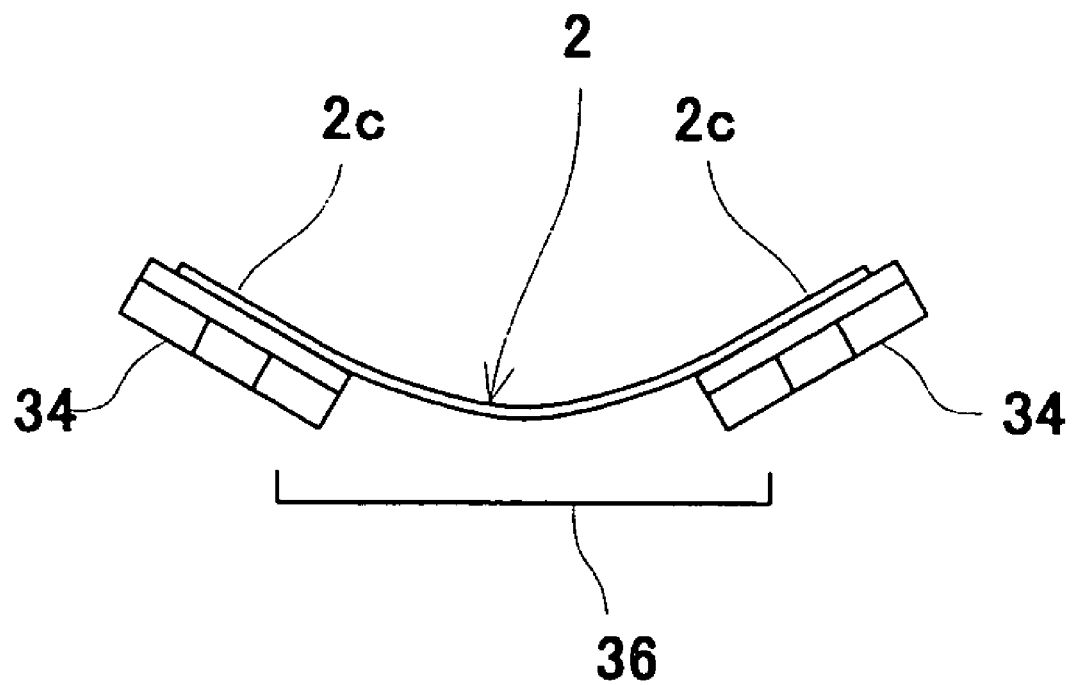
FIG. 9 is a front view showing a state in which the belt side portions are further inwardly bent by scrapers.

Even when the return belt has trough shape, the cutwater rollers 30 or the scrapers 34 (see FIG. 9) may be independently provided, or the cutwater rollers 30 and the scrapers 34 may be arranged along the direction in which the belt moves, so that the residues adhering to the belt side portions can be effectively removed.

In the above case, since the cutwater and scraping at the belt side portions in the width direction can be reliably carried out, water receivers 36 provided on the lower side of the conveyor may be installed only at the center portion of the belt width over the entire conveyor.

Subsequently, an example of the air-cushion belt conveyor to which the present invention is applied will be described.

Figure 10:
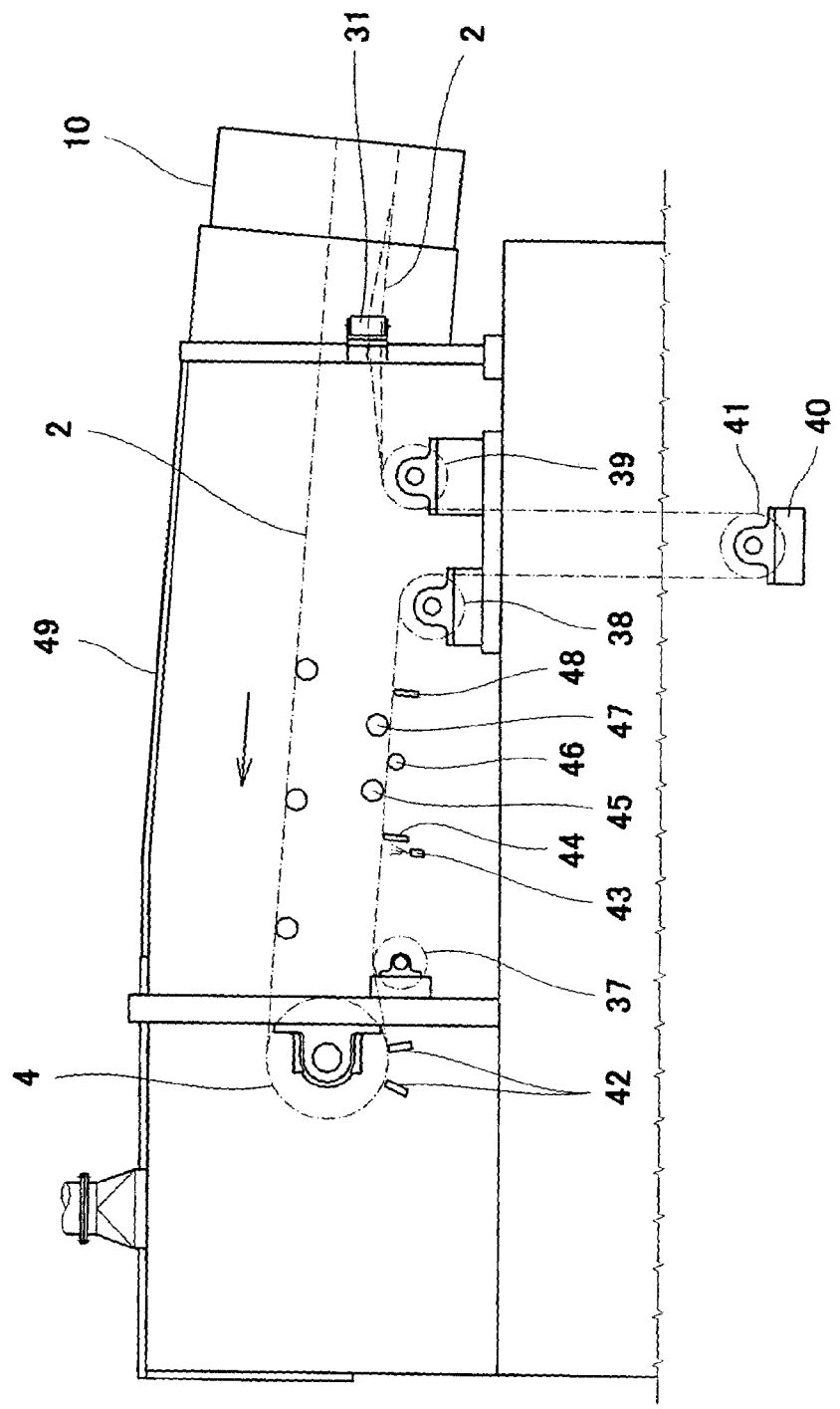
FIG. 10 is a side view showing an end portion of an air-cushion belt conveyor to which the present invention is applied.

FIG. 10 is a side view showing an end portion of the air-cushion belt conveyor. The conveyor is configured such that the belt 2 curved in trough shape is floating due to an air pressure and moving inside a duct 10. The belt 2 passes through an inside of the duct 10 and is suspended in an endless state at both end portions through end pulleys 3, 4. The belt 2 moves around the end pulley 3, through a guide pulley 37, and through tension pulleys 38, 39 provided in opposition for guiding the belt in U-shape and a tension pulley 41 including a counter weight 40 provided between these pulleys 38, 39, and then returns to the inside of the duct 10.

In the vicinity of a portion of the belt 2 inverted at a circulating end portion of the end pulley 3, two belt cleaners 42 having plate-shaped scraper portions are provided for removing residues adhering to the belt 2. Between the guide pulley 37 and the tension pulley 38, a water washing nozzle 43, a scraper (belt cleaner) 44, a press roller 45 for pressing the belt 2 from above, a press roller 46 for pressing the belt 2 from below, a press roller 47 for pressing the belt 2 from above, and a scraper (belt cleaner) 48 are arranged in this order. Thereby, after inversion, the cleaners 42 scrape the residues adhering to the belt 2, and thereafter, the residues adhering to the belt 2 are washed away and the residues in an solidified state are fluidized by the water washing nozzle 43 and scraped by the following scraper 44. The belt 2 is water-cut and dehydrated while snaking through the three press rollers 45–47, and the residues pressed and thereby layered between the rollers and the belt are scraped by the following scraper 48.

Since the press rollers 45–47 are the conventional straight-line shaped rollers extending in the width direction of the belt 2, they might be insufficient to remove the residues at the belt side portions. Accordingly, downstream of these rollers and before the duct 10 into which the belt 2 in trough shape moves, the residue removing means for the belt side portions is provided as described below.

Figure 11:
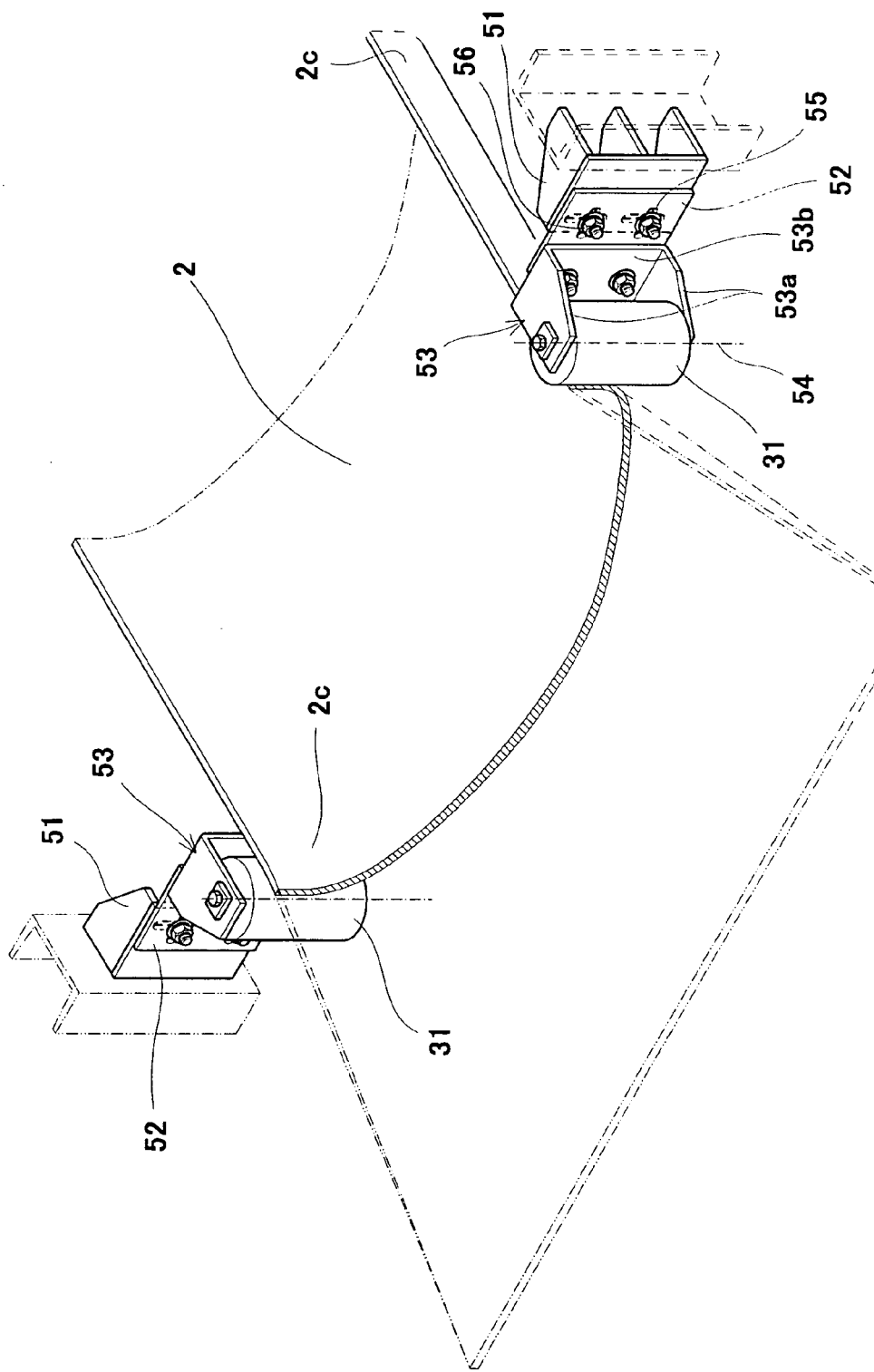
FIG. 11 is a perspective view showing main part of a residue removing means according to the present invention which is installed on the air-cushion belt conveyor.
Figure 12:
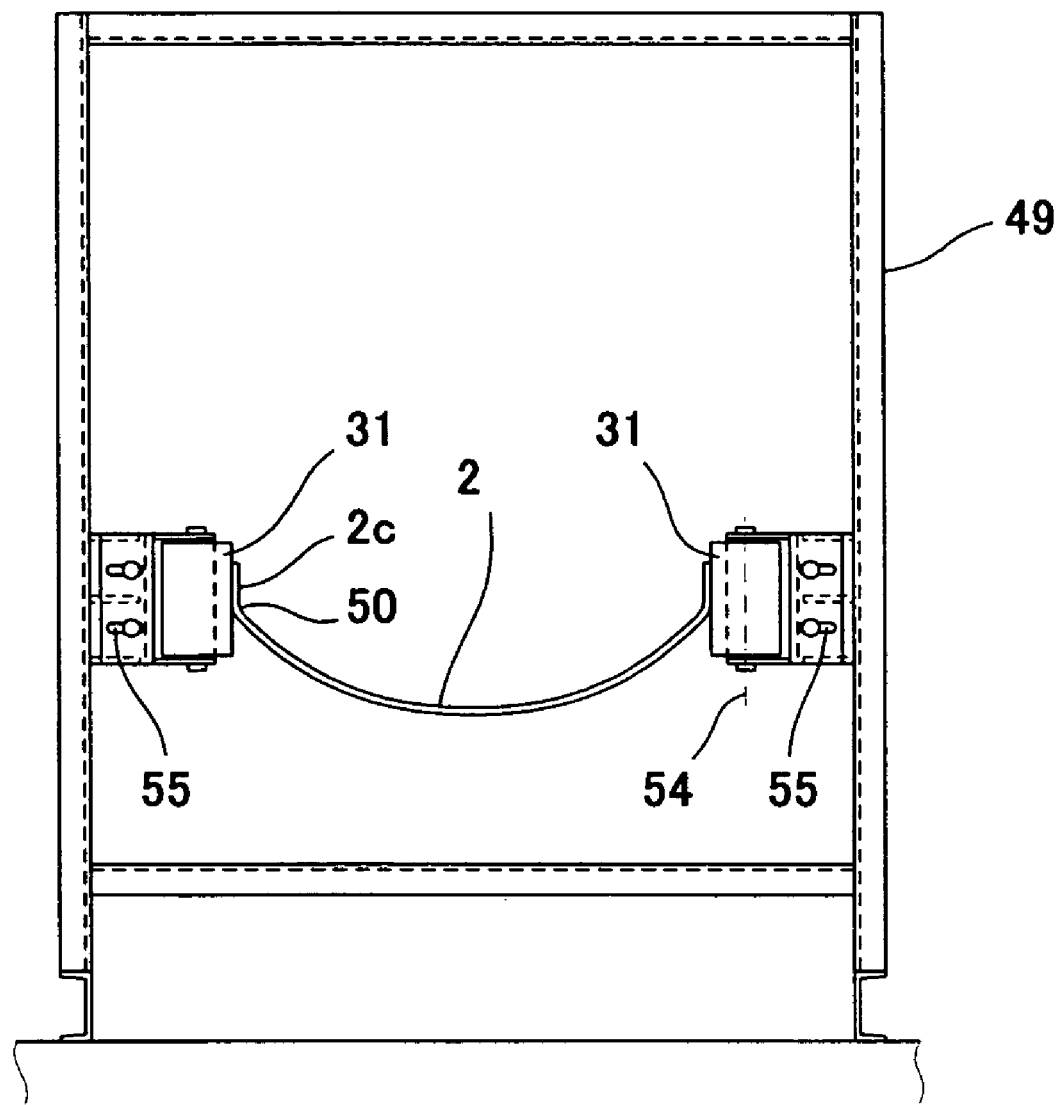
FIG. 12 is a front view showing the residue removing means in FIG. 11.
Figure 13:
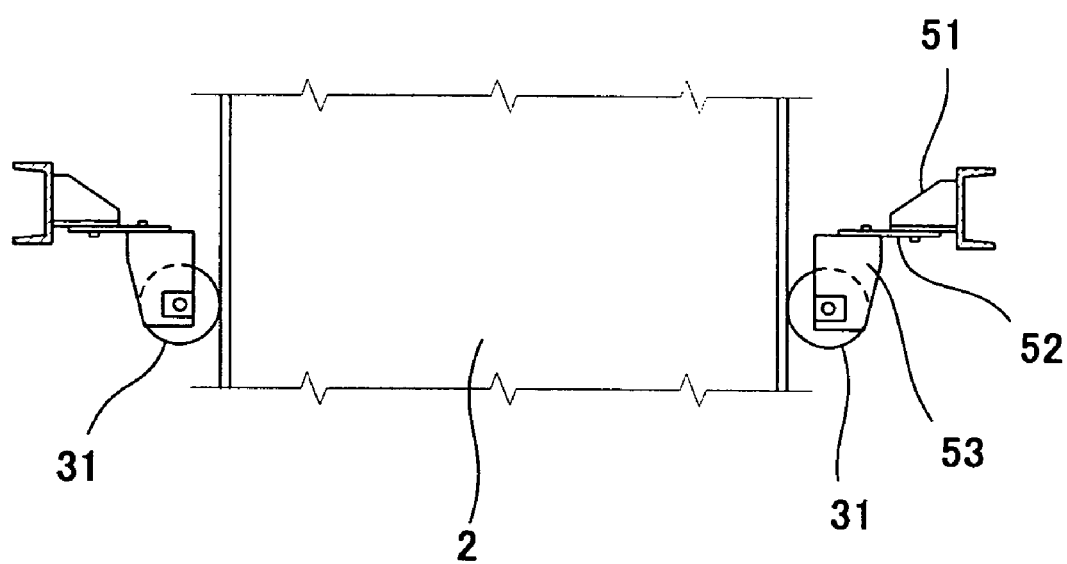
FIG. 13 is a plan view showing the residue removing means in FIG. 11.

FIG. 11 is a perspective view showing main part of the residue removing means. FIG. 12 is a front view. FIG. 13 is a plan view. The residue removing means is based on the above-mentioned principle in FIG. 8. The residue removing means is constituted by cutwater rollers 31 provided on both side walls of a casing 49, and is installed in the state in which the belt side portions 2 are greatly curved so as to have the inflection points 50. Specifically, a pair of mounting brackets 51 are provided in opposition on both side walls of the casing 49, and are each provided with a U-shaped member 53 through an extended plate 52. Between horizontal plates 53a constituting the U-shaped member 53 and vertically opposed to each other, a shaft 54 is provided. A cutwater roller 31 is rotatably provided on the shaft 54. The extended shaft 52 bolted to a back-surface side of a vertical plate 53b constituting the U-shaped member 53 extends toward the direction of the side wall of the casing 49. The extended plate 52 is provided with horizontally elongated holes 55 in the vertical direction. The extended plate 52 is fixed to the mounting bracket 51 through the elongated holes 55 by means of bolts and nuts 56. Since the elongated holes 55 are horizontally long, the fixing position of the extended plate 52 is horizontally displaced by loosening the nuts, thereby causing the cutwater roller 31 to be movable close to or away from the belt. Thereby, a stable pressing force to the side portion 2c of the belt is obtained and the pressing force can be suitably adjusted. Besides, since the belt is curved by bending in the opposite direction to bending of the curved forward belt, the scraping of the residues adhering to the belt side portions can be facilitated and reliably conducted.

Figure 14:
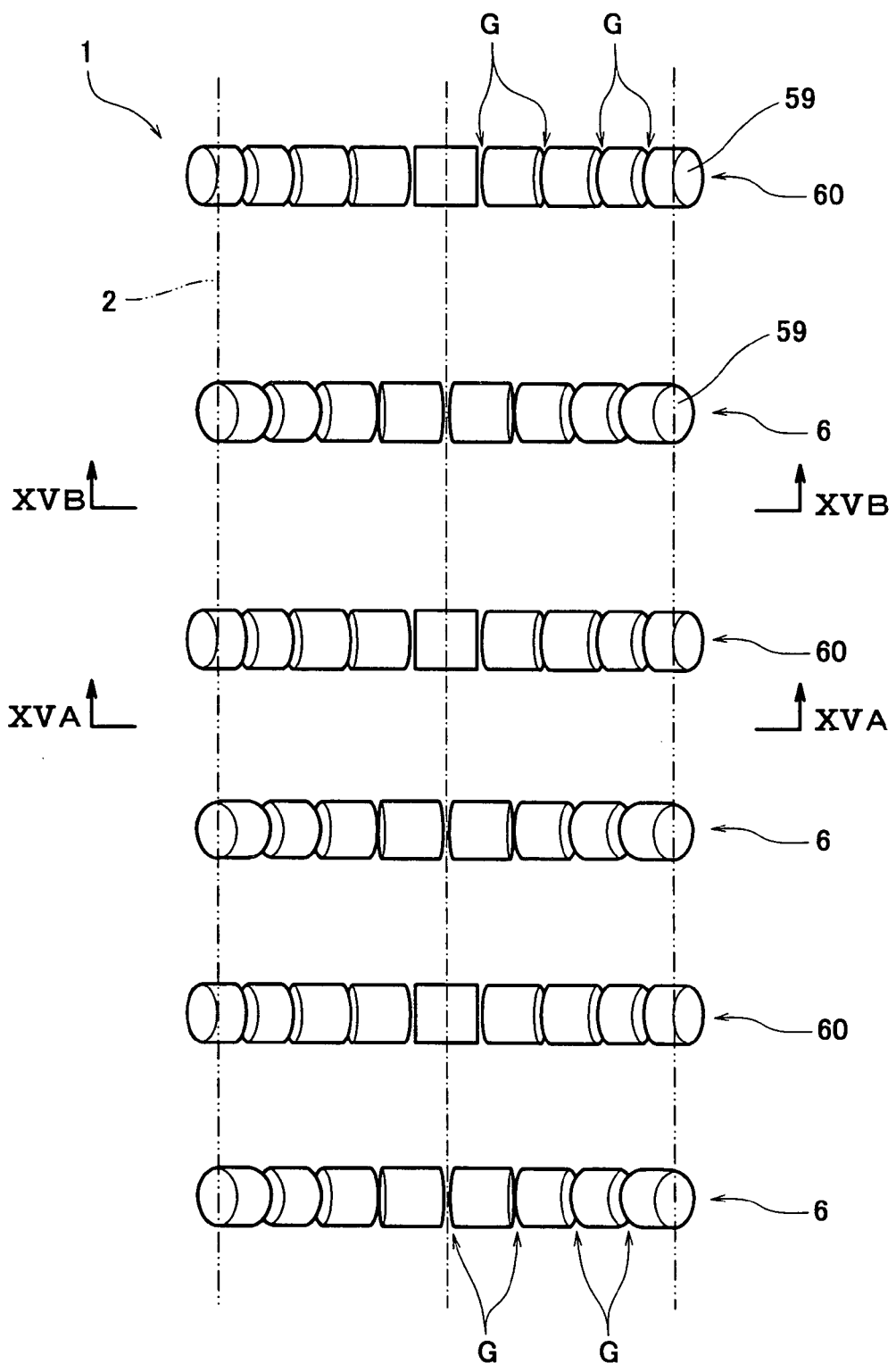
FIG. 14 is a plan view in the direction of arrows taken along line XIV—XIV in FIG. 1.

FIG. 14 is a plan view in the direction of arrows taken along line XIV—XIV in FIG. 1. FIG. 15(a) is a cross-sectional view taken along line XVA—XVA in FIG. 14 and FIG. 15(b) is a cross-sectional view taken along line XVB—XVB in FIG. 14.

From the entrance-side pulley 3 to the entrance 5a of the trough 5 (FIG. 1), plural support roller trains 6, 60 are arranged as being spaced from each other under the forward portion of the belt 2 (upper-stage belt portion moving to the left in the Figure).

As shown in FIGS. 14 and 15, the support roller train 6 comprised of eight rollers 59 as support elements arranged in the shape of circular-arc along the width direction of the belt, and the support roller train 60 comprised of nine rollers 59 arranged in the shape of circular-arc along the width direction of the belt are alternately provided. All the support roller trains 6, 60 are comprised of the rollers 59 of the same configuration. The support roller train 6 comprised of the eight rollers is configured such that each set of four rollers 59 are arranged at the same pitch on the left side and on the right side with respect to the center of the belt in the width direction. The support roller train 60 comprised of nine rollers is configured such that one roller 59 is placed at the center of the belt in the width direction, and each set of four rollers 59 are arranged on the left side and on the right side at the same pitch as the support roller train 6 comprised of eight rollers. This follows that between adjacent support rollers 6, 60, gaps G between the rollers 59 are arranged so as not to be on straight lines as seen from the longitudinal direction of the belt 2.

This reduces deformation of the belt by bending along the longitudinal direction of the belt. The number of rollers of each support train is not intended to be limited to eight or nine. The number of rollers may be less than eight or more than nine. Nonetheless, it is preferable that one train is comprised of more rollers 59, because the deformation by bending is more relieved, and the corresponding positions are increased.

The characteristic in which the gaps between the rollers are arranged so as not to be on the straight lines as seen from the longitudinal direction of the belt 2 is applicable to support roller trains on an exit side of the trough 5, although this is not shown. This characteristic is also applicable to the lower support roller trains 7 provided below the return portion (lower-stage belt portion moving to the right in FIG. 1). When the return portion of the belt 2 is flat and the support roller train is comprised of flat rollers as shown in FIG. 31, the deformation by bending need not be taken into account, but, in some cases, troughs of circular-arc cross-section are employed even on the return belt. In such cases, the support roller trains 6, 60 may be employed.

In the above embodiment, the support roller train of the same configuration is arranged every other train, but the present invention is not limited to this. For example, the support roller train of the same configuration may be arranged every three or more trains. This follows that the gaps between the rollers of three or more roller trains are arranged so as not to be on straight lines. In extreme cases, the gaps between rollers of all the trains are arranged so as not to be on straight lines as seen from the longitudinal direction of the belt.

Figure 16:
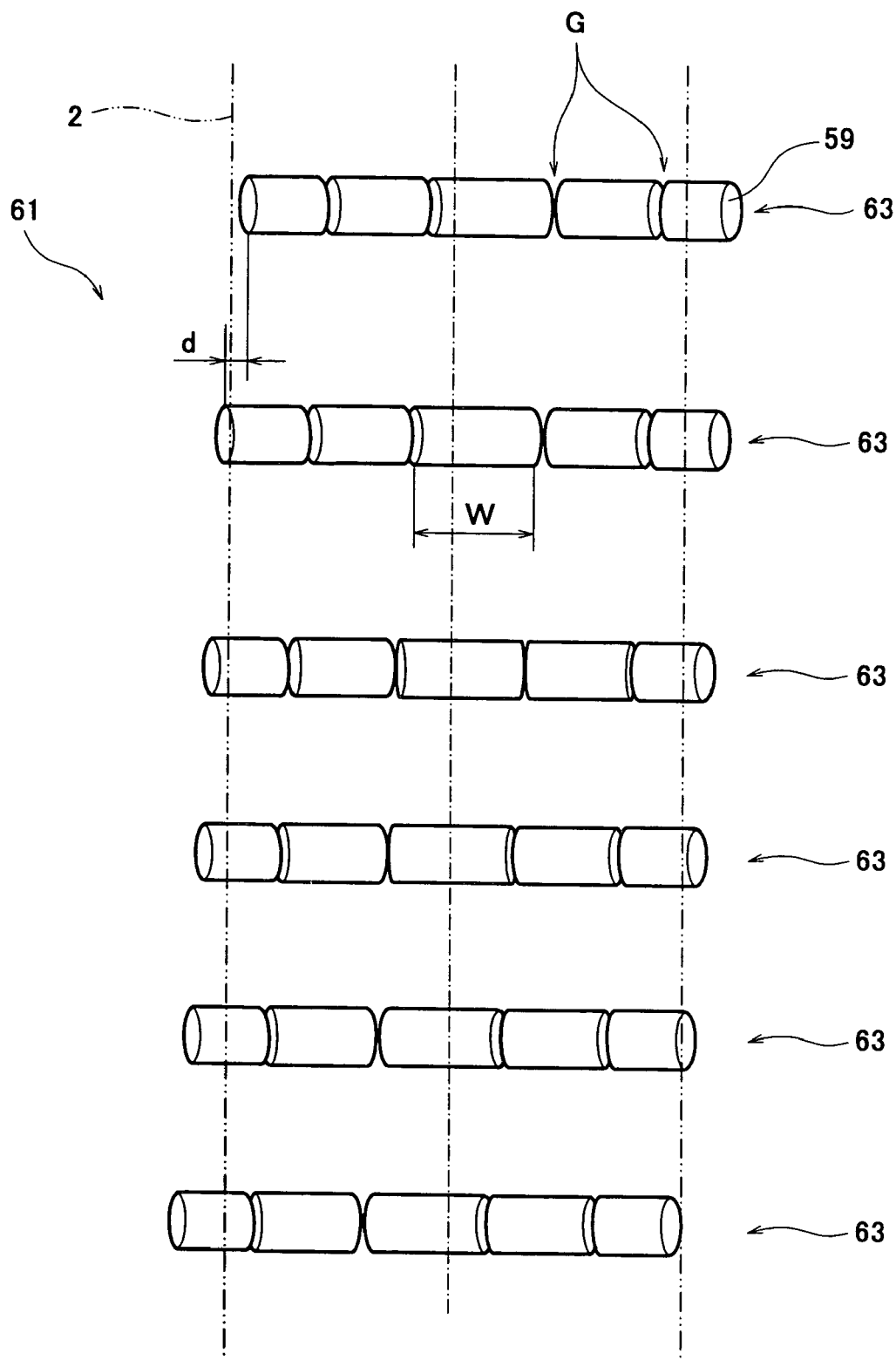
FIG. 16 is a plan view showing main part of another embodiment of the belt conveyor of the present invention.

For example, in a belt conveyor 61 shown in FIG. 16, respective support roller trains 63 are configured such that the rollers of the same shape equal in number are shifted at the same pitch. However, all the support roller trains 63 are shifted from one another in the width direction of the belt 2 with respect to the center point of the belt 2 in the width direction. Although it is preferable that more rollers 59 are arranged in one support roller train 63, five rollers 4 are arranged in one support roller train 63 for easier understanding. Assuming that six support roller trains are arranged in the state in which each of the trains is comprised of five rollers each having a length W of 220 mm, the positions of the rollers in adjacent support roller trains are shifted by d=44 mm in the width direction of the belt 2.

In the above embodiment, to make difference between the gaps G between the rollers, the number and arrangement of the rollers of the same shape are changed for each support roller train. But, the present invention is not limited to this. The positions of the gaps G are made different by changing the length W of the rollers. Nevertheless, in view of manufacturing cost, it is desirable to use the rollers of the same shape.

In a belt conveyor 62 in FIG. 17(a), the support roller train as the first support member is replaced by a support sliding member train 66 in which sliding members 64 are arranged along the width direction of the belt 2 and a support sliding member train 67 in which another sliding members 65 are arranged along the width direction of the belt 2. The sliding members 64, 65 are so-called support elements, and are formed of synthetic resin or the like with small friction coefficient and high wear resistance, for example, super-polymer polyethylene. The material of the sliding members can be selected from various kinds of materials.

For example, as shown in FIGS. 17(a) and 17(b), bar-shaped sliding members 64 extending in the longitudinal direction of the belt 2 may be used. Fixing brackets 64a are provided on the sliding members 64. As shown in FIGS. 17(a) and 17(c), it is possible to use cylindrical sliding members 65 with their center axes extending in the width direction of the belt 2. Alternatively, the resin may be molded into the cylindrical sliding members 65, or a resin layer may be formed on a surface of a metal cylinder or the like. The bar-shaped sliding members 64 are C-shaped in cross-section as shown in the Figure. The bar-shaped sliding members 64 may be manufactured by forming a resin layer on a surface of a metal gutter of C-shaped cross-section. Alternatively, the resin may be molded in the shape of bar. When these sliding members 64, 65 are used, it is necessary that the gaps G between the sliding members of at least adjacent support sliding members be arranged so as not to be on the straight lines as seen from the longitudinal direction.

The bar-shaped sliding members 64 and the cylindrical sliding members 65 may coexist in one support sliding member train, although this is not shown. In that case, the cylindrical sliding members 65 are continuously provided so as to conform to the length of one bar-shaped sliding member 64 in the longitudinal direction of the belt. Further, these sliding members and the support rollers may coexist. Moreover, the support roller train and the support sliding member may coexist. In brief, it is important that the gaps G between the sliding members or the rollers be arranged so as not to be on the straight lines as seen from the longitudinal direction of the belt.

FIG. 18(a) shows that a belt conveyor 82 provided with support sliding members 68, 69 having different shapes as the second support members. As shown in FIGS. 18(a) and 18(b), one support sliding member 68 is plate-shaped and extends in the shape of circular-arc along the width direction of the belt 2 and along the longitudinal direction of the belt 2. As shown in FIGS. 18(a) and 18(c), the other support sliding member 69 is bar-shaped and extends in the shape of circular-arc in the width direction of the belt 2. The support sliding members 68, 69 are each substantially C-shaped in cross-section. That is, by downwardly curving the side portion of the belt 2 in the lateral direction, the resistance to the belt 2 can be reduced. The support sliding members 68, 69 are provided with fixing brackets 68a, 69a on their rear side, respectively. FIG. 18(d) is a view in the direction of arrows taken along line VID—VID in FIG. 18(a), and shows the bar-shaped support sliding member 69. As seen from this direction, the shape of the bar-shaped support sliding member 69 is the same as that of the plate-shaped support sliding members 66.

The support sliding members 68, 69 may coexist on one belt conveyor 82 as shown in the Figure, but the present invention is not limited to this configuration. For example, one of the support sliding members 68, 69 may be arranged to be spaced at prescribed intervals. Since these support sliding members 68, 69 serve to support the belt continuously in the width direction of the belt 2, the deformation by bending does not occur because of the absence of the gaps G.

Alternatively, as shown in FIG. 19, both of or one of the two types of support sliding members 68, 69, and part or all of the support roller trains 6, 60, 63 and the sliding member trains 66, 67 may coexist along the direction in which the belt moves. Such a configuration serves to unbend the deformation of the belt by bending which is caused by the support roller trains or the sliding member trains. In this sense, it is preferable that the support sliding member is placed as the support member closest to the entrance 5a of the trough 5. Further, both of or one of the two types of support sliding members 68, 69 and the conventional support roller trains 206 (FIG. 30) may be combined.

The support sliding member, the support roller train, or the like closest to the trough 5 may be placed as spaced apart from the end portion of the trough 5. Nonetheless, as shown in FIG. 19, it is preferable that the support sliding member 68 (or 69) is placed in contact with an entrance end of the trough 5. This can seal a space R of compressed air between the belt 2 and the trough 5 (see FIG. 19(b)) by the support sliding member 68, and therefore, the belt 2 can be floating well. To this end, the support sliding member 68(or 69) may be placed in contact with an exit end of the trough 5. It should be appreciated that, to produce a satisfactory seal effect, a curvature of cross-section of the support sliding member 68 in contact with the entrance end of the trough 5 is preferably set smaller than a curvature in cross-section of the trough.

Figure 20:
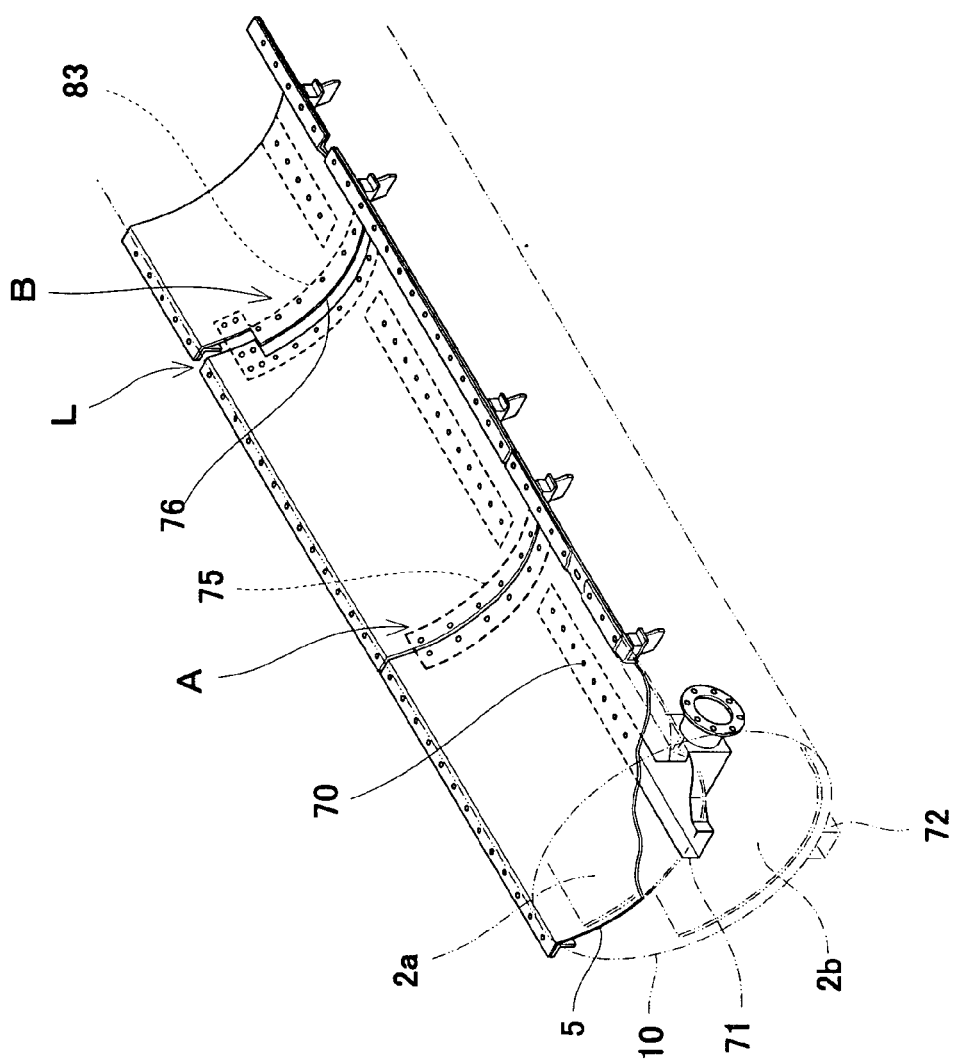
FIG. 20 is a schematic view showing an example of the air-cushion conveyor to which the present invention is applied.

FIG. 20 is a perspective view showing an example of the troughs 5 in the belt conveyor 1 in FIG. 1. Inside the duct 10 of a circular pipe shape forming a long carrying path, a curved forward trough 5 on a carrying side is suspended in the diametric direction of the duct 10, and on an upper surface of the forward trough 5, the forward belt 2a is provided. An air-supply chamber 71 is provided at the center of the lower portion of the forward trough 5 in the carrying direction (longitudinal direction of the trough). The forward trough 5 is provided with air-supply holes 70 at even intervals so as to communicate with the sir-supply chamber 71.

Products are loaded on the forward belt 2a. The forward belt 2a is caused to float and move above the troughs 5 while forming an air layer between the troughs 5 and the belt 2 by air for air-cushion ejected through the air-supply holes 70 from the air-supply chamber 71 and carries the products to target position. The forward belt 2a turns back at a terminal portion of the carrying path and becomes the return belt 20b, which floats and moves along the inner surface of the duct 10 below the forward trough 5 by the air for air-cushion ejected through the air-supply holes (not shown) from the air-supply chamber 72 under the duct 10.

A portion indicated by a solid line in FIG. 20 is the forward trough 5. Since the forward trough 5 forming the carrying path is long, a plurality of troughs 5 are joined in the longitudinal direction. A connecting portion A connects the troughs 5 in such a manner that end faces of the troughs 5 are butted with each other with little gap, and a backing member 75 spanning over the end faces of both troughs is provided on lower surfaces of the troughs and fixed by means of bolts, nuts, and the like as a fixing member.

A connecting portion B has a sliding structure obtained by connecting the troughs with gaps 76 between these troughs so that one of the troughs 5 is slidable along a guide plate 83. The sliding structure is formed as a labyrinth seal mechanism L as mentioned later.

FIG. 21 is a schematic view simply representing the connecting portion B, in which FIG. 21(a) is a plan view, FIG. 21(b) is a longitudinal sectional view at a portion where the air-supply chamber 71 is provided, and FIG. 21(c) is a side cross-sectional view.

As shown in FIG. 21(a), the center portion of one trough 57a is formed to have a rectangular concave portion 78 and the other trough 57b is formed to have a rectangular convex portion 79 to be fitted in the concave portion 78.

The adjacent troughs 57a, 57b are placed in such a manner that the convex portion 79 of the other trough 57b is inserted into the concave portion 78 of the one trough 57a so that one of these troughs is slidable along the longitudinal direction. The convex portion 79 is fitted in the concave portion 78 substantially to a half depth, with the gaps 76 allowing for the required sliding amount of the trough, and minute gaps 77a are each formed between a side face 78a of the concave portion 78 and a side face 79a of the convex portion 79. Therefore, in this state, a wide air passage (groove) 77b is formed between a tip end face 79b of the convex portion 79 and a back end face 78b of the concave portion 78 (center portion). Also, wide air passages 77c perpendicular to the minute gaps 77a are each formed between a tip end face 78c of the one trough 57 having the concave portion 78 and a face 79c of the other trough 57b which is opposed to the tip end face 78c.

Under the troughs, a guide plate 83 which is entirely substantially U-shaped is suspended between the troughs 57a, 57b so as to cover these gaps 76, 82.

Therefore, the gaps 76 entirely communicate with the wide air passage (groove) 77b at the center portion and the minute gaps (minute air passage) 77a, and with outer wide air passages 77c. From the entire structure of the gaps 76, this can be called a labyrinth groove 76. That is, the labyrinth seal mechanism L is formed. The leakage of the air for air-cushion supplied from the air-supply chamber 71 to the air passage (groove) 77b at the center portion through the air-supply passage 70 is effectively suppressed by the minute gaps 77a. Since the minute gap 77a is formed by the side face 78a of the concave portion 78 and the side face 79a of the convex portion 79, which are parallel to the direction in which the trough slides, the cross-sectional area of the gap 70a does not substantially change irrespective of the sliding of the trough, and hence, slight air leakage amount does not change.

By locating the minute gaps 77a inwardly of the belt end faces 2c, leakage of the air for air-cushion is suppressed. That is, as shown in FIG. 21(b), the air for air-cushion ejected from the air-supply holes 70 forms the air layer between the trough 5 and the belt 2a, and escapes from the minute gap between the upper surface of the trough 5 and the belt end face 2c while floating the belt 2a. So, by locating the minute gaps 77a slightly inwardly of the belt end faces 2c in view of snaking movement of the belt 2a, the leakage of the air can be effectively prevented.

FIG. 22(a) and FIG. 22(b) are a side cross-sectional view and a rear view in the case where the guide plate 83 is also provided with the air-supply chambers 73. A U-shaped guide plate 83 is provided so as to close the labyrinth groove 76 from the rear side of the trough 5, thus forming the labyrinth groove 76 as described above.

The trough 57b on the right side in the Figure is called a fixed side, i.e., the guide plate 83 and the trough 57a are fixed by means of a fixing member such as bolts and nuts. The left-side trough 57a is slidably connected by means of the fixing member such as bolts and nuts through elongated holes 86 provided in the guide plate 83.

Specifically, as shown in FIG. 23(a), a stud bolt 85 is protruded from the lower surface of the trough 57a by welding, and loosely fitted into an elongated hole 86 provided in the guide plate 83 (or large-diameter hole) long in the direction in which the trough 57a moves, and a nut 88 is screwed to the stud bolt 85 through a washer 87 spanning the elongated hole 86 (or large-diameter hole).

Or, as shown in FIG. 23(b), a flush dent hole 89 is formed on the trough 57a side, a flush bolt 90 is fitted into the hole 89, a head of the flush bolt 90 protrudes from the elongated hole 86 (or large-diameter hole) provided in the guide plate 83, and a nut 88 is screwed to the flush bolt 90 through the washer 87.

As shown in FIG. 22, an air-supply chamber 71 is provided under the trough 5. The guide plate 83 is also provided with the air-supply chamber 73 and has an air-supply hole 74 communicating with an air passage of the air-supply chamber 73. Between the air-supply chamber 71 of the trough 57b and the air-supply chamber 73 of the guide plate 83, a hose or a pipe 84 is provided to allow these chambers to communicate with each other. Thereby, the air for air-cushion is also supplied to the air passage (groove) 76 of the connecting portion between the troughs. This ensures stable floatation of the belt at the connecting portion between the troughs. Although it is preferable that the air-supply chamber 73 of the guide plate 83 is connected to the air-supply chamber 71 of the fixed trough 57b, this may be connected to the air-supply chamber 71 of the sliding trough 57a by means of an extensible/compressive hose.

FIG. 24 shows an example in which the slide structure having the labyrinth seal mechanism is structured into multiple stages for increasing the sliding amount of the trough. FIG. 24(a) is a side cross-sectional view, and FIG. 24(b) is a rear view. The same reference numerals as those in FIGS. 20 to 22 are used to identify the same or corresponding parts, which will not be further described.

When a large sliding amount (for example, approximately 60 mm in total) is intended to be absorbed at one connecting portion, a large gap is required at the connecting portion between the troughs, which causes insufficient air for air-cushion, thereby resulting in unstable movement of the belt.

FIG. 24 shows an example in which a trough 58a provided with convex portions 81 on both sides and a trough 58b provided with concave portions 81 on both sides are interposed between the left trough 57a and the right trough 57b in the example in FIG. 22, thereby forming a multi-staged sliding structure. The connecting portions having the sliding structure are each provided with the labyrinth seal mechanism L. The air-supply chamber 71 is provided under each trough, and the air-supply chambers 71 are interconnected by means of a hose or a pipe 84a. It should be appreciated that the guide plate 83 may be provided with the air-supply chamber connected by means of the hose or the pipe as shown in the example in FIG. 22 for the purpose of compensating for insufficient air for air-cushion at the connecting portion.

As a matter course, the sliding structure having the labyrinth mechanism of the present invention is applicable to the return trough in the duct 10 in FIG. 20, a trough of an air-cushion conveyor of a double cylinder shape, or a trough of an air-cushion conveyor comprising a pair of ducts (reciprocating pipe) in the vertical direction.

Figure 25:
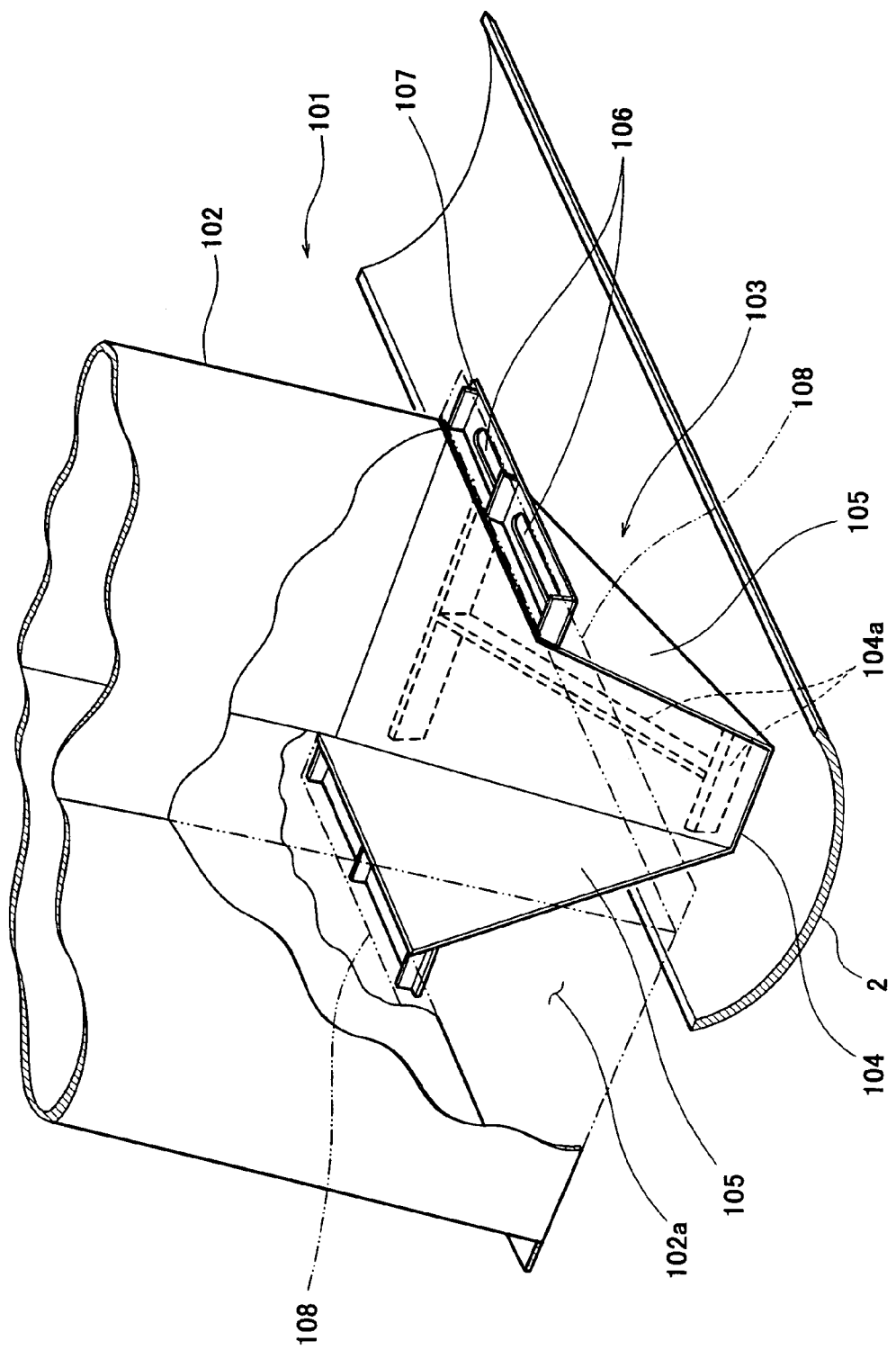
FIG. 25 is a perspective view showing a guide member in FIG. 1.

FIG. 25 is a perspective view showing a guide member in FIG. 1.

In FIG. 1, the shoot 8 is provided above the belt 2 between the entrance-side pulley 3 and the trough entrance 5a. The shoot 8 is inclined slightly forwardly (toward the direction in which the belt 2 moves) from vertical. The shoot 8 may be vertically provided. A lower end of the shoot 8 has an opening 8. The guide member 103 is mounted to a rear portion of the opening 8a. The guide member 103 and the shoot 8 constitute the loading device 101 for loading the products on the belt 2. In this case, the shape of the opening in the lower end of the shoot 8 may be, for example, an ellipse other than rectangle.

FIG. 25 shows a detail of the guide member 103. The guide member 103 has a trapezium-shaped bottom plate 104 inclined forwardly and downwardly, and side plates 105 vertically provided on both sides of the bottom plate 104. The bottom plate 104 is inclined more greatly than the shoot 8. With this configuration, the product dropping through the inside of the shoot 8 reaches the bottom plate 104 and is then loaded on the belt. The trapezium-shaped bottom plate 104 has a width decreasing toward its front. Therefore, by substantially conforming the center of a front edge of the bottom plate 104 to the center of the belt in the width direction, the products are gathered to the center of the belt and evenly distributed in the right and left direction from the center corresponding to a crest of mountain, so that uneven distribution of the products in the width direction of the belt can be avoided. A reinforcement rib 104 is provided on a lower surface of the bottom plate 104.

A flange portion 107 provided with elongated holes 106 for mounting bolts is provided on an upper end side of the side plate 105. As corresponding to the elongated holes 106, flange portions 108 and bolt holes (not shown) are provided on both sides of the lower end of the shoot 8. With this structure, the guide member 103 is mounted so as to be displaceable in the front and rear direction (longitudinal direction of the belt 2) with respect to the opening 8*a* of the shoot 8. The elongated holes may be formed in the flange portions 108 of the shoot 8 and the bolt holes may be formed in the flange portions 107 of the guide plate 103. This results in long elongated holes. As a result, the guide member 103 can be displaceable within a long range. The both side plates 105 are configured to have an upper end conforming to sides of the rectangular opening 8*a*, and hence extend outwardly and upwardly.

As shown in FIG. 26, in accordance with the guide member 103 (FIG. 26(*a*)), even the products dropping in an unevenly distributed state in the width direction through the inside of the shoot 8 (FIG. 26(*b*)) are in large part loaded on the belt 2 from the front edge of the bottom plate 104 having a small width. That is, since the both side plates 105 extend outwardly and upwardly as described above, the products dropping through the inside of the shoot 8 in a dispersed state are naturally gathered to the center portion (FIG. 26(*c*)). Therefore, most of the products are gathered to the center portion of the belt 2 in the width direction (FIG. 26(*d*)), and are evenly distributed laterally. In addition to the front opening 103*a* of the guide plate 103, a front portion 8*b* of the opening 8*a* of the shoot 8 serves as an exit for the products from the shoot 8. Therefore, even when a great many products are dropping, the shoot 8 does not get clogged.

FIG. 27 shows a case where a center line of a cross-section of the shoot 8 does not conform to a center line of the guide member 103. It is most desirable that the longitudinal center line of the guide member 103 conform to the center line of the belt 2. Nonetheless, more often than not, the longitudinal center line of the installed shoot 8 somewhat deviates from the center line of the belt 2. The guide member 103 is easily mounted to such a shoot 8 so as to conform to the center line of the belt 2. That is, as shown in the Figure the flange portion 107 of the guide member 103 and the flange portion 108 of the shoot 8 may be extended so as to offset the above deviation, and then overlapped with each other. In this case, it is preferable that the opening 8*a* of the shoot 8 is located in the guide member 103.

Figure 28:
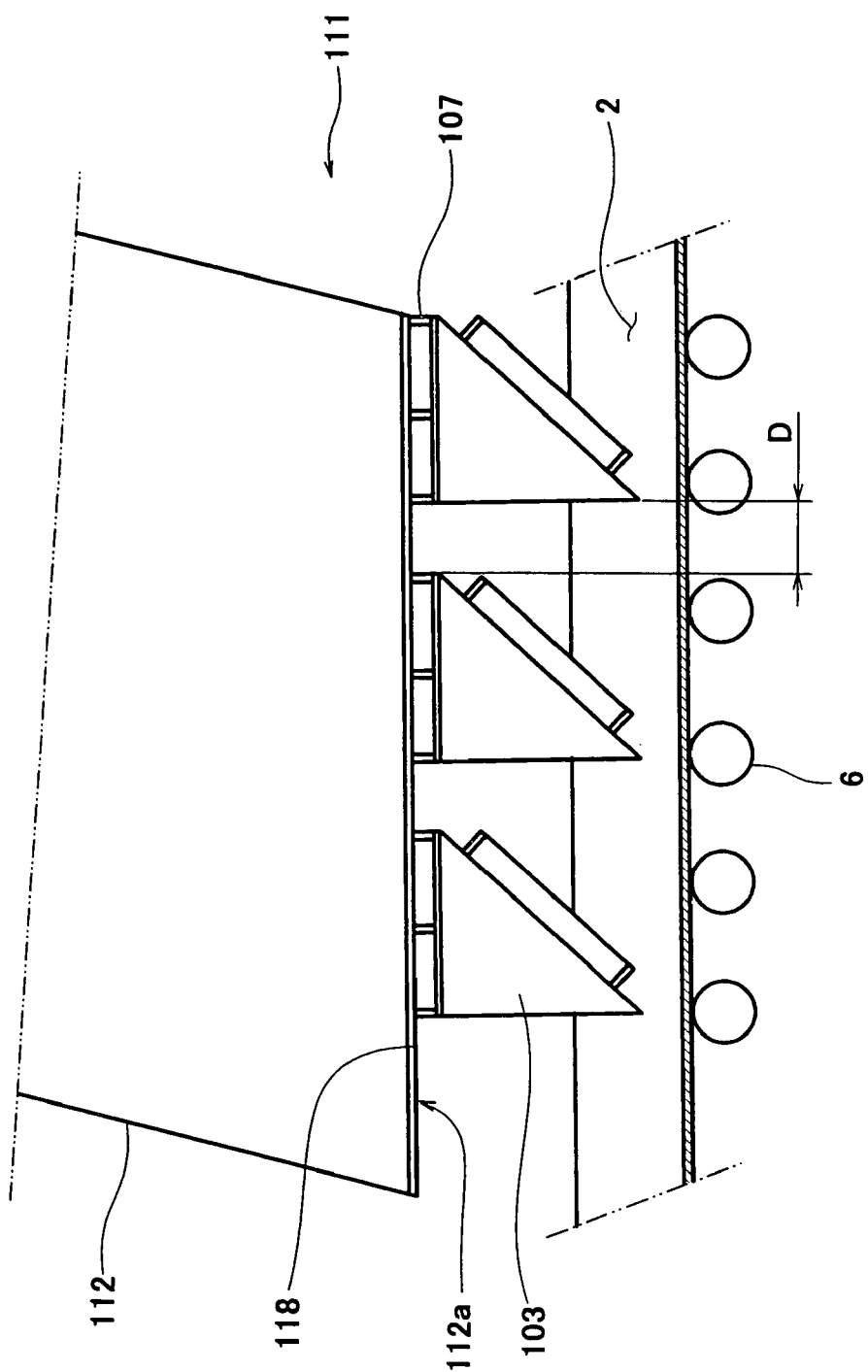
FIG. 28 is a side view showing another embodiment of the loading device of the present invention.

A loading device 111 in FIG. 28 is configured such that a plurality of guide members 103 are mounted to the opening 102*a* of the lower end of the shoot 102 along its longitudinal direction. Since the longitudinal dimension of the opening 102*a* of the lower end of the shoot 102 is larger than that of the shoot 8 in FIG. 1, the structure and shape of the guide members 103 are configured to be identical to those in FIG. 25. Therefore, each guide member 103 is longitudinally displaceable with respect to the opening 102*a* of the lower end of the shoot. Reference numeral 118 denotes a flange portion of the shoot 102. The description of the other details are omitted. It should be noted that, according to the longitudinal dimension of the opening 102*a* of the lower end of the shoot 102, the guide members having a smaller longitudinal dimension may be installed. It is preferable that in the loading device 111, a distance D is set between adjacent guide members 103 as shown in the Figure for the purpose of larger area of the opening 102*a* of the shoot. Also, instead of the above arrangement of the guide members, the height of the lower ends of the plurality of guide members may decrease as they are away from the front. To be specific, to prevent the products being loaded from the guide member located behind from abutting with the lower end of the guide member located in front, the lower end of each guide member is set slightly higher than that of the guide member located adjacently and behind.

In accordance with the loading device 111, even when a great many products drop or the products drop in a dispersed state, all the guide members 103 are capable of gathering these to the center of the belt 2.

Figure 29:
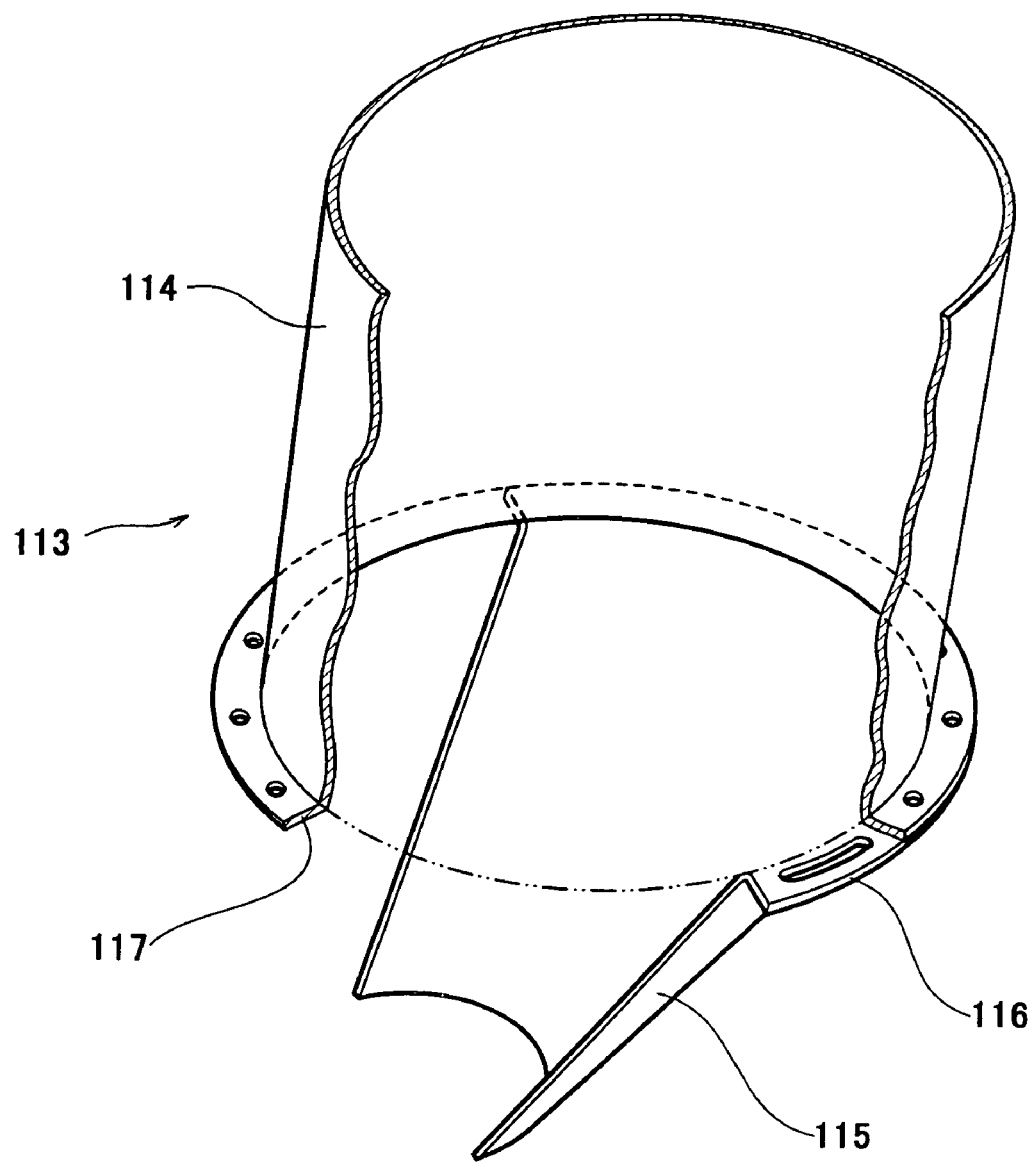
FIG. 29 is a perspective view showing another embodiment of the loading device of the present invention.

In the loading device 113 in FIG. 29, a shoot 114 has a circular-arc cross-section. A guide member 115 is shaped suitably for the shoot 114. To be specific, the guide member 115 is obtained by longitudinally dividing in two a tube of a cone with head cut off (a frustum of a cone). In other words, the bottom plate and the side plate are continuously and integrally curved. Therefore, the guide member 115 has a horizontal cross-section of a circular-arc shape. The average curvature of the circular-arc cross-section is set larger toward a carrying path face (the average curvature radius is smaller). And, the guide member 115 is mounted to the rear portion of the lower end of the shoot 114 in a downwardly and forwardly inclined condition. As a result, the circular-arc of the upper end edge of the guide member 115 becomes different from the circular-arc of the lower end edge of the shoot 114. Therefore, non-conformity occurs in the connecting portion between the guide member 115 and the shoot 114, and the resulting gap can be easily closed by flange portions 116, 117.

According to the guide member 115, since the products are loaded on the belt 2 from the front end edge having a small curvature radius, most of the products are gathered to the center portion of the belt 2 in the width direction.

The guide member 115 is shaped with the frustum of the cone longitudinally divided in two. The frustum of the cone is not limited to be divided in two but, may be cut along a face including two radiuses forming a desired angle such as 120°, 150°, or 210° from the center of the frustum of the cone. Alternatively, a frustum of an elliptical cone may be cut in the manner described above.

In the above-mentioned loading devices 101, 111, 113, the guide members 103, 115 are mounted to the shoots 8, 114, respectively, but the present invention is not limited to this configuration. For example, the guide member may be mounted to the duct 10 or the skirt 9 so as to be position-adjustable. In this state, the shoot may be installed such that its lower end somewhat enters the inside of the guide member. By mounting the guide member to the duct 10 or the skirt 9 so as to conform to the center line of the belt 2, there arises no problem regardless of non-conformity between the center line of the cross-section of the shoot 8 and the center line of the belt 2 as described above (FIG. 27).

The present invention is applicable to any other belt conveyors as well as the air-cushion belt conveyor. Further, the present invention is applicable to conveyors other than the belt conveyor.

In accordance with the present invention, the friction resistance between the side portion of the belt and the trough can be greatly reduced while ensuring the space for the compressed air for air-cushion between the belt and the trough. As a result, equipping cost and operation cost of the belt conveyor can be reduced and life of the belt can be prolonged.

In addition, in accordance with the present application, the residues are removed independently only at the belt side portions. So, the residues can be effectively removed without being affected by the deformation of the belt and reduction of the pressing force.

Since the cutwater and scraping at the belt side portions in the width direction can be reliably conducted, the dropping water or powder receivers (water receivers) can be installed only at the center portion of the belt in the width direction under the conveyor, and therefore can be installed in a narrow space.

Further, the deformation of the belt by bending can be reduced or prevented, and the belt can be sufficiently floated without an increase in an air pressure.

Still further, the leakage amount of the air for air-cushion can be reduced, and the amount of air supply can be reduced. Because of stabilized amount of air leakage, the belt can float stably and the moving resistance can be reduced. The width of the air passage at the labyrinth portion becomes constant regardless of change in the gap between the troughs by providing the labyrinth seal mechanism at the connecting portion between the troughs. As a result, since the leakage amount of the air for air-cushion becomes constant, the belt can be kept floating stably and moving with reduced resistance.

Moreover, in the conveyor such as the belt conveyor, uneven distribution of the products can be prevented, and snaking of the carrying path such as the belt can be prevented.

What is claimed is:

1. A trough of an air-cushion belt conveyor, the belt conveyor being provided with interconnected troughs, wherein
   the troughs have a sliding structure with a gap between the troughs so as to be slidable in their longitudinal direction, and
   a labyrinth seal mechanism capable of preventing change in leakage amount of air for an air-cushion regardless of change in the gap due to sliding of the trough is provided at a connecting portion between the troughs.

2. The trough of an air-cushion belt conveyor according to claim 1, wherein
   at the connecting portion between the troughs, the troughs are fitted at their concave and convex portions with a gap in a direction in which the trough slides, thereby forming the sliding structure, and minute gaps parallel to the direction in which the trough slides are created during sliding of the trough, thereby forming the labyrinth seal mechanism.

3. The trough of an air-cushion belt conveyor according to claim 2, wherein the minute gaps constituting part of the labyrinth seal mechanism are provided inwardly of belt side portions.

4. The trough of an air-cushion belt conveyor according to claim 1, wherein the sliding structure having the labyrinth seal mechanism is provided in multiple stages in the longitudinal direction of the troughs.

5. A trough of an air-cushion belt conveyor, the belt conveyor being provided with interconnected troughs, wherein
   the troughs have a sliding structure with a gap between the troughs so as to be slidable in their longitudinal direction, and
   a seal member capable of preventing leakage of air for an air-cushion regardless of change in the gap due to sliding of the trough is provided at a connecting portion between the troughs, and wherein
   a guide plate is provided at the connecting portion between the troughs, for guiding movement of the trough, the guide plate being provided with an air-supply chamber for supplying air for air-cushion and an air-supply hole through which a gap for permitting sliding communicates with the air-supply chamber.

6. The trough of an air-cushion belt conveyor according to claim 5, wherein the guide plate is fixed to one of the troughs, and the other trough is slidably engaged with the guide plate through an elongated hole or a large-diameter hole provided in the guide plate.

7. The trough of an air-cushion belt conveyor according to claim 1, wherein a guide plate is provided at the connecting portion between the troughs, for guiding movement of the trough, and the guide plate is fixed to one of the troughs, and the other trough is slidably engaged with the guide plate through an elongated hole or a large-diameter hole provided in the guiding plate.

* * * * *

UNITED STATES PATENT AND TRADEMARK OFFICE
CERTIFICATE OF CORRECTION

PATENT NO.        : 6,971,508 B2
APPLICATION NO.   : 10/344566
DATED             : December 6, 2005
INVENTOR(S)       : Takashi Kotaki et al.

Figure 32:
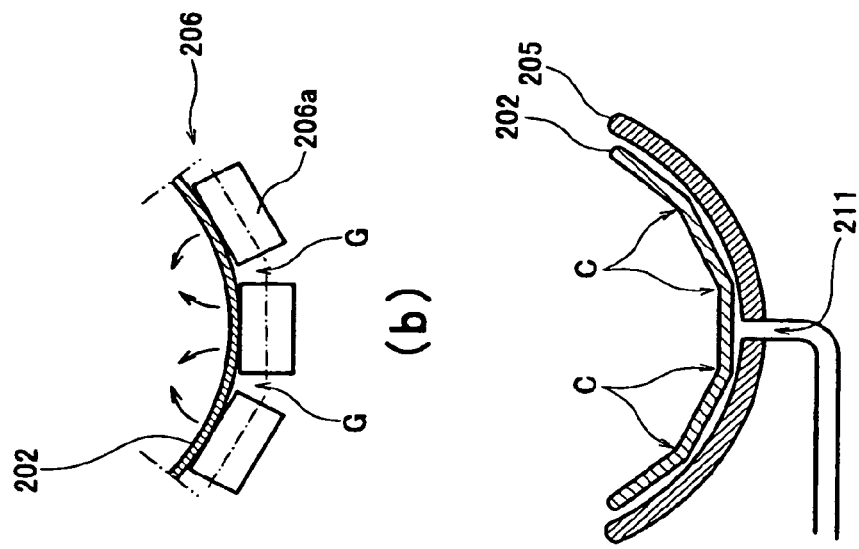
FIG. 32(a) is a view taken in the direction of arrows along line XXXIIA—XXXIIA in FIG. 30.
FIG. 32(b) is a view taken in the direction of arrows along line XXXIIB—XXXIIB in FIG. 30.
FIG. 32(c) is a cross-sectional view schematically showing a state of the belt on the troughs.
Figure 32:
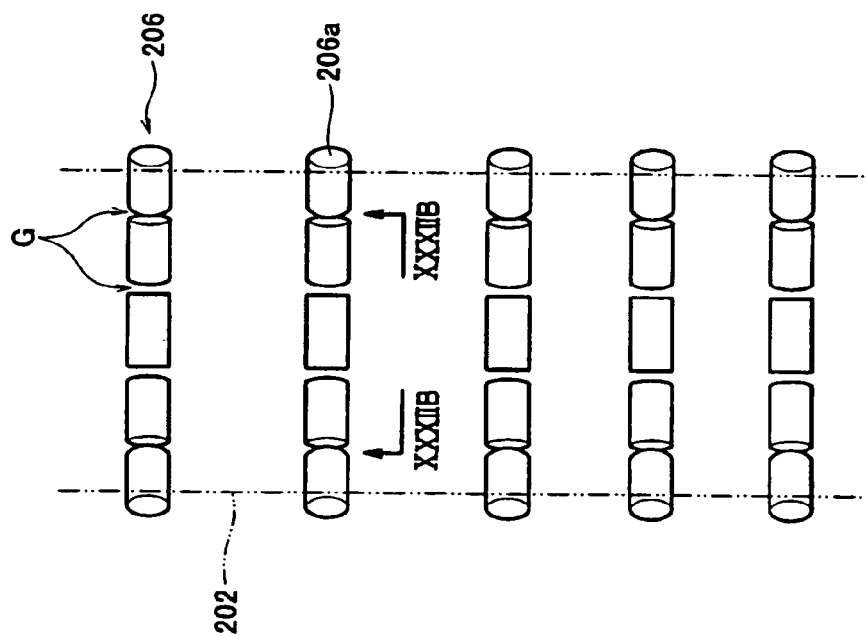
Figure 33:
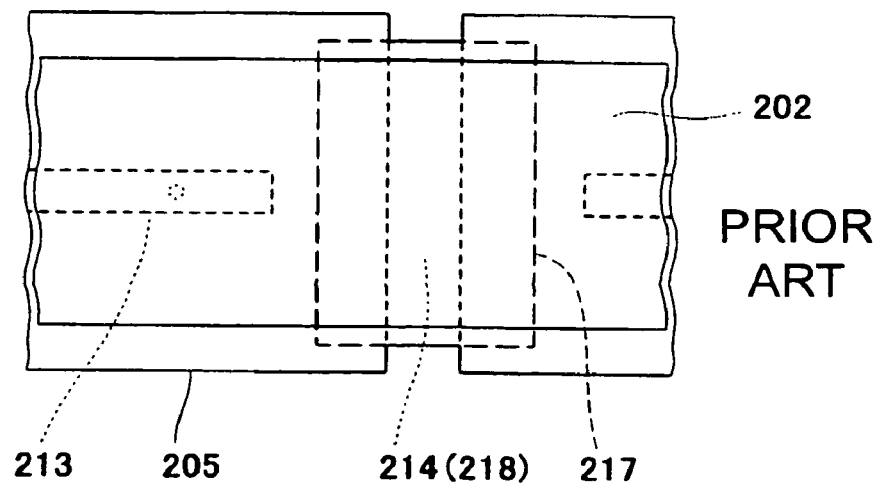
FIG. 33(a) is a plan view showing an example of a connecting portion between the conventional troughs.
FIG. 33(b) is a longitudinal sectional view thereof.
FIG. 33(c) is a side cross-sectional view thereof.
Figure 33:
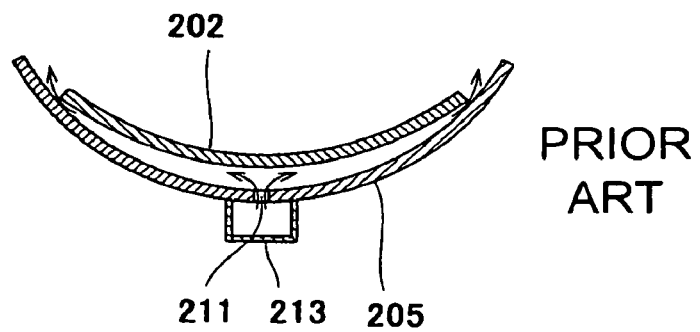
Figure 33:
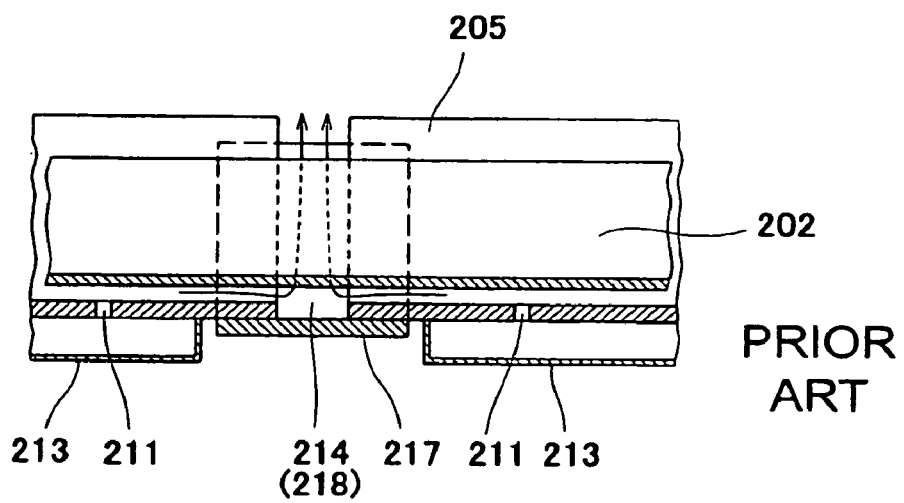

It is certified that error appears in the above-identified patent and that said Letters Patent is hereby corrected as shown below:

In the drawings, Sheet 32, Fig. 32, --Fig. 32-- should be added to the caption before (b), and the caption "Fig. 32(b)" should be changed to --Fig. 32(c)--, as is shown below.

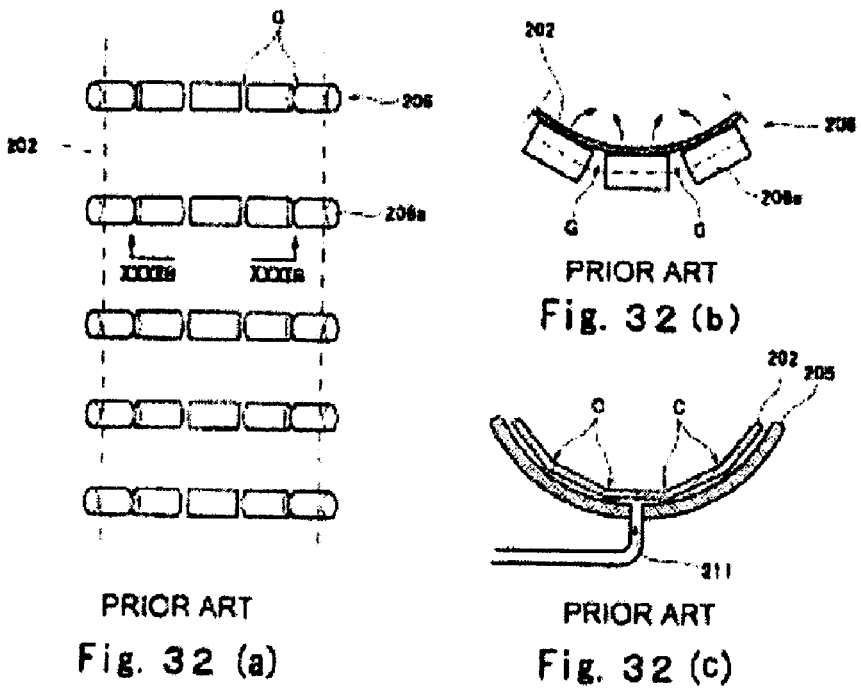

Signed and Sealed this

Twenty-fourth Day of June, 2008

JON W. DUDAS
*Director of the United States Patent and Trademark Office*